United States Patent
Jiao et al.

(10) Patent No.: US 8,384,728 B2
(45) Date of Patent: Feb. 26, 2013

(54) SUPPLEMENTAL CACHE IN A GRAPHICS PROCESSING UNIT, AND APPARATUS AND METHOD THEREOF

(75) Inventors: Guofang Jiao, San Diego, CA (US); Jian Liang, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 947 days.

(21) Appl. No.: 11/855,812

(22) Filed: Sep. 14, 2007

(65) Prior Publication Data

US 2009/0073177 A1    Mar. 19, 2009

(51) Int. Cl.
*G09G 5/36*    (2006.01)
(52) U.S. Cl. ........................................... 345/557
(58) Field of Classification Search ............... 345/557, 345/501
See application file for complete search history.

(56) References Cited

U.S. PATENT DOCUMENTS

| | | | | |
|---|---|---|---|---|
| 5,801,711 A | * | 9/1998 | Koss et al. | 345/441 |
| 6,690,380 B1 | * | 2/2004 | Hussain et al. | 345/557 |
| 6,717,577 B1 | * | 4/2004 | Cheng et al. | 345/419 |
| 6,972,769 B1 | * | 12/2005 | Nebeker et al. | 345/552 |
| 2003/0011592 A1 | * | 1/2003 | Southwell et al. | 345/420 |

FOREIGN PATENT DOCUMENTS

EP    1255227 A1    11/2002

OTHER PUBLICATIONS

International Search Report and Written Opinion—PCT/US2008/076215, International Search Authority—European Patent Office—May 8, 2009.
European Search Report—EP08006409—Search Authority—Berlin—Apr. 28, 2009.

* cited by examiner

*Primary Examiner* — Edward Martello
(74) *Attorney, Agent, or Firm* — James R. Gambale, Jr.

(57) ABSTRACT

Disclosed herein is a supplemental cache for use with a graphics processing unit. The supplemental cache can be used to supplement a vertex cache used with a graphics processing unit. The supplemental cache stores vertex values generated in assembling primitives from vertices provided to the graphics processing unit as part of an image geometry. Generated vertex values associated with a vertex determined to be shared by two or more primitives can be retrieved from the supplemental cache, so as to reduce the need to perform duplicative operations to generate vertex values for shared vertices.

26 Claims, 12 Drawing Sheets

INPUT STREAM: 0, 1, 2

TRIANGLE 601A: vertices 0, 1, 2

2, 1, 3

TRIANGLE 601B: vertices 2, 1, 3

2, 3, 4

TRIANGLE 601C: vertices 2, 3, 4

INPUT STREAM (CONT.): 4, 3, 5

TRIANGLE 601D: vertices 3, 4, 5

4, 5, 6

TRIANGLE 601E: vertices 4, 5, 6 n-3, n-2, n-1

TRIANGLE 601N: vertices n-3, n-2, n-1

FIGURE 6

TRIANGLE 601A:

TRIANGLE 601B:

TRIANGLE 601C:

TRIANGLE 601D:

SUPPLEMENTAL CACHE IN A GRAPHICS PROCESSING UNIT, AND APPARATUS AND METHOD THEREOF

TECHNICAL FIELD

This disclosure relates to graphics processing units and, more particularly to processing images with graphics processing units.

BACKGROUND

A graphics processing unit (GPU) is a dedicated graphics rendering device used to generate computerized graphics for display on a display device. GPUs are built with a highly-parallel structure that provides more efficient processing than typical, general purpose central processing units (CPUs) for a range of complex algorithms. For example, the complex algorithms may correspond to representations of three-dimensional computerized graphics. In such a case, a GPU can implement a number of primitive graphics operations to create three-dimensional images for display on a display device more quickly than using a CPU to draw the image for display on the display device.

A typical GPU receives an image geometry and uses a pipeline approach to generate graphics which can be output, for example, for display on a display device. A typical graphics pipeline includes a number of stages which operate in parallel, with the output from one stage possibly being used at another stage in the pipeline. For example, a typical graphics pipeline comprises vertex shader, primitive assembly, perspective projection and viewport transformation, primitive setup, rasterization, hidden primitive and pixel rejection, attribute setup, attribute interpolation and fragment shader stages.

A vertex shader is applied to the image geometry for an image and generates vertex coordinates and attributes of vertices within the image geometry. Vertex attributes include, for example, color, normal, and texture coordinates associated with a vertex. Primitive assembly forms primitives, e.g., point, line, and triangle primitives, from the vertices based on the image geometry. Formed primitives can be transformed from one space to another using a perspective projection and viewport transformation which transforms primitives from a normalized device space to a screen space. Primitive setup can be used to determine a primitive's area, edge coefficients, and perform occlusion culling (e.g., backface culling), and 3-D clipping operations.

Rasterization converts primitives into pixels based on the XY coordinates of vertices within the primitives and the number of pixels included in the primitives. Hidden primitive and pixel rejection use the z coordinate of the primitives and/or pixels to determine and reject those primitives and pixels determined to be hidden (e.g., a primitive or pixel located behind another primitive or pixel in the image frame). Attribute setup determines attribute gradients, e.g., a difference between the attribute value at a first pixel and the attribute value at a second pixel within a primitive moving in either a horizontal (X) direction or a vertical (Y) direction, for attributes associated with pixels within a primitive. Attribute interpolation interpolates the attributes over the pixels within a primitive based on the determined attribute gradient values. Interpolated attribute values are sent to the fragment shader for pixel rendering. Results of the fragment shader can be output to a post-processing block and a frame buffer for presentation of the processed image on the display device.

Coordinates and attributes of vertices are used at multiple processing stages along the GPU pipeline. For example, coordinates associated with each primitive are used at the primitive assembly, perspective projection and viewport transformation, primitive setup, rasterization and hidden primitive and pixel rejection stages. FIG. 1 provides an example of triangle primitives, and the vertices of each. Triangle 1 of FIG. 1 has vertices 0, 1, and 2, triangle 2 has vertices 3, 4, and 5, and triangle N has vertices 3*N−3, 3*N−2 and 3*N−1. In the example, the number of vertices that are operated on in the GPU pipeline can be as many as three times the number of triangles, with each vertex having multiple associated coordinates and attributes. In such a case, the "coordinates-processing" stages operate on multiple coordinates for each of the three vertices for a given triangle. Similarly and in a case that a triangle is used as the primitive, the "attribute-processing" stages operate on multiple attributes for each vertex for a given triangle. The GPU pipeline therefore processes a large amount of data at a given stage, and a large amount of data is being moved from one stage to another.

SUMMARY

The present disclosure seeks to address failings in the art and to provide efficiencies in graphics image processing using a supplemental cache in a graphics processing unit, e.g., a primitive setup cache, which stores coordinate and/or attribute values for vertices shared by two or more primitives.

Disclosed herein is a system, method and apparatus, in which a supplemental cache is used to supplement a vertex cache used with a graphics processing unit. The supplemental cache stores vertex values generated in assembling primitives from vertices provided to the graphics processing unit as part of an image geometry. Generated vertex values associated with a vertex determined to be shared by two or more primitives can be retrieved from the supplemental cache. By virtue of this arrangement and by way of a non-limiting example, efficiencies in processing an image geometry can be achieved, by "re-using" generated values for vertices determined to be shared between primitives process by a graphics pipeline. By way of a further non-limiting example, efficiencies are achieved as a result of a reduction in operations performed in connection with vertices determined to be shared by multiple primitives processed by the graphics processing unit. In addition and since generated values for "shared vertices" are retrieved from the supplemental cache, reduced bandwidth is needed for transferring vertex values between a vertex cache used by the graphics processing unit and the graphics processing unit.

In at least one embodiment, a method is described for use with a graphics processing unit, which determines whether at least one vertex of a primitive currently being processed by the graphics processing unit is a vertex of a primitive previously processed by the graphics processing unit. For each vertex of the current primitive determined to be a vertex of a previously-processed primitive, a stored value corresponding to the vertex of the previously-processed primitive is used for the current primitive. For each vertex of the current primitive determined to be other than a vertex of a previously-processed primitive, a value corresponding to the other vertex is generated in processing the current primitive.

In accordance with one or more embodiments, a system is described in which a graphics processing unit is configured to execute a graphics processing pipeline to process an image geometry for an image. A vertex cache is coupled to the graphics processing pipeline, the vertex cache stores at least one value corresponding to one or more vertices within the image geometry. A supplemental cache coupled to the graphics processing pipeline stores values generated from the values stored in the vertex cache. A vertex preprocessor of the graphics processing pipeline is configured to make a determination as to whether a vertex within the image geometry has values stored in the vertex cache, and to provide information for a given vertex to the graphics processing pipeline. The information provided by the vertex preprocessor indicates an outcome of the determination and at least one index value corresponding to at least one value stored in the vertex cache for the given vertex. The graphics processing pipeline is configured to use at least one generated value stored in the supplemental cache for a primitive currently being processing by the graphics processing pipeline based on the information provided by the vertex preprocessor.

This brief summary has been provided so that the nature of the invention may be understood quickly. A more complete understanding of the invention can be obtained by reference to the following detailed description of the preferred embodiment(s) thereof in connection with the attached drawings.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 6 provides an example of an input vertex stream in a case that the primitive type is a triangle list and the corresponding triangle primitives processed in accordance with embodiments of the present disclosure.

DETAILED DESCRIPTION

Figure 1:
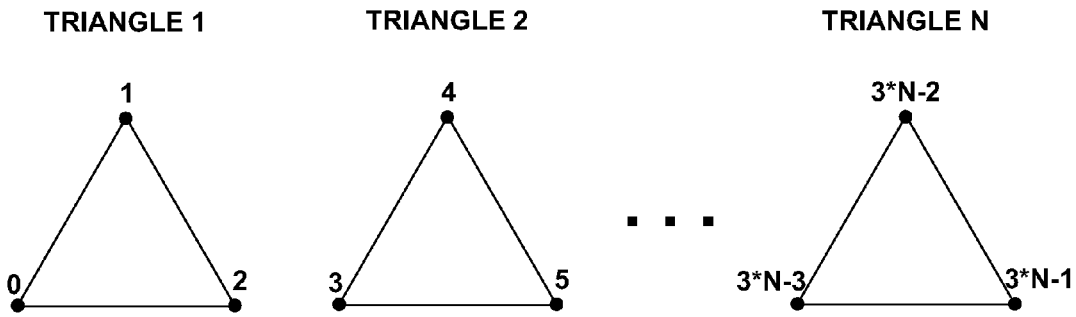
FIG. 1 provides an example of triangle primitives, and the vertices of triangle primitives.

Certain embodiments of the present disclosure will now be discussed with reference to the aforementioned figures, wherein like reference numerals refer to like components.

In accordance with one or more embodiments, a system, method and apparatus are disclosed, in which a supplemental cache is used to supplement a vertex cache used with a graphics processing unit.

Figure 2:
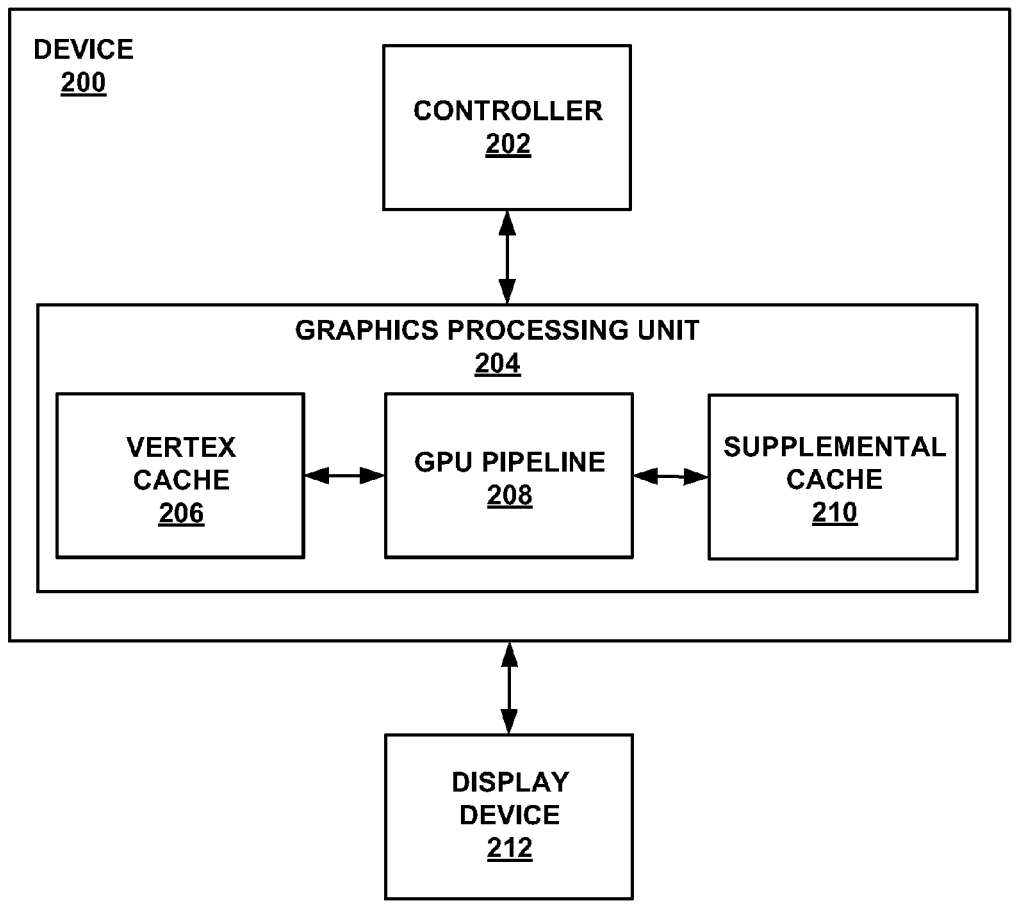
FIG. 2 is a block diagram illustrating an exemplary device including a graphics processing unit that implements techniques for processing computerized images using a supplemental cache in accordance with one or more embodiments of the present disclosure.

FIG. 2 is a block diagram illustrating an exemplary device 200 including a graphics processing unit (GPU) 204 that implements techniques for processing computerized images using a supplemental cache 210 to supplement a vertex cache 206, in accordance with one or more embodiments of the present disclosure. In the example of FIG. 2, device 200 includes a controller 202 capable of controlling operation of GPU 204. Controller 202 may also be capable of controlling operation of device 200. In accordance with the techniques described herein, GPU 204 includes a GPU pipeline 208 and vertex cache 206 coupled to GPU pipeline 208. Incorporation of a vertex cache 206 can reduce an amount of data passing through GPU pipeline 208 within GPU 204. In addition, GPU 204 includes supplemental cache 210, which can be used to reduce the amount of data transferred between vertex cache 206 and GPU pipeline 208 and reduce computation for the perspective projection and viewport transformation.

GPU 204 receives an image geometry for an image from controller 202 within device 200. The image geometry may correspond to representations of complex, two-dimensional or three-dimensional computerized graphics. GPU 204 processes the image geometry to present image effects, background images, or video gaming images, for example, to a user of device 200 via a display device 212. The images may be formed as video frames in a sequence of video frames. Display device 212 may comprise a liquid crystal display (LCD), a cathode ray tube (CRT) display, a plasma display, or other type of display, or other output, device integrated with or coupled to device 200, by way of non-limiting examples.

By way of a non-limiting example, in some cases, controller 202 receives the image geometry from applications operating within device 200. For example, device 200 can comprise a computing device operating a video gaming application based on image geometry received from an internal hard drive or a removable data storage device. In other exemplary cases, controller 202 can receive the image geometry from applications operating external to device 200. For example, device 200 can comprise a computing device operating a video gaming application based on image geometry received from an external server via a wired or wireless network, such as the Internet. The image geometry might be received via streaming media or broadcast media, via a wired connection, wireless connection or a combination of both.

When a user of device 200 triggers an image effect, selects a background image, or initiates a video game, for example, controller 202 receives the corresponding image geometry from an application and sends the image geometry to GPU 204. GPU 204 processes the image geometry to prepare the corresponding image for presentation on display device 212. For example, GPU 204 can implement a number of primitive graphics operations, including operations to form one or more primitives (e.g., point, line, triangle, shape, polygon, etc.), to create an image represented by the received image geometry for output to an output device, such as display device 212, for example.

According to the techniques described herein, GPU pipeline 208 receives the image geometry for the image and stores coordinate and attribute values for vertices within the image geometry in vertex cache 206. GPU pipeline 208 passes vertex coordinates that identify the vertices, and vertex cache index values that indicate storage locations of the attributes for each of the vertices in vertex cache 206 to other processing stages along GPU pipeline 208. In some embodiments, GPU pipeline 208 temporarily stores the vertex coordinates in vertex cache 206. In addition, GPU pipeline 208 uses supplemental cache 210 to store vertex values generated by GPU pipeline 208 during primitive setup and processing, in accordance with one or more embodiments. In accordance with one or more of such embodiments, the supplemental cache 210 is used during primitive setup to store vertex values generated during primitive setup, such vertex values include transformed (or otherwise generated) coordinate values and/or generated attribute values, for example. In this manner, GPU pipeline 208 can temporarily store vertex values generated in connection with a previously-processed primitive for possible use with a subsequently-processed primitive, which shares one or more vertices with the previously-processed primitive, resulting in a decrease in the amount of information that must be retrieved from vertex cache 206, and resulting in a decrease is repetitive operations being performed to generate the vertex values.

In accordance with one or more embodiments, vertex values comprise vertex coordinates and vertex attributes. Vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. Vertex attributes, for example, may include color, normal, and texture coordinates associated with a vertex.

GPU pipeline 208 within GPU 204 includes at least three major pipeline stages: a vertex shader stage, a primitive setup and interpolation stage, and a fragment shader stage. The primitive setup and interpolation stage in GPU pipeline 208 includes several sub-stages, each of which perform a function using either the vertex coordinates or the vertex attributes. For example, primitive setup and primitive rejection use vertex coordinates to form primitives and to discard a subset of the primitives that are determined to be unnecessary for an image frame to be displayed. A primitive is a type of geometric form, including but not limited to a point, line, triangle, or other polygon or shape, which can be formed from one or more vertices within the image geometry. By way of a non-limiting example, a primitive or a portion of a primitive can be rejected from consideration during processing of a specific frame of the image when the primitive or the primitive portion is determined to be invisible (e.g., located on a backside of an object), outside an image frame, or hidden (e.g., located behind another object) within the image frame.

By way of another non-limiting example, attribute gradient setup and attribute interpolation use a primitive's vertex attributes to compute attribute gradient values and interpolate the attributes based on the attribute gradient values. Techniques described in this disclosure can be used in accordance with one or more embodiments of the present disclosure to defer computationally-intensive setup of attribute gradients to a point after hidden primitive and pixel rejection and before attribute interpolation in GPU pipeline 208. In so doing, attribute gradient calculations can be avoided for those vertices/primitives/pixels that are rejected by hidden primitive and pixel rejection. For those vertices that are not rejected by hidden primitive and pixel rejection, embodiments of the present disclosure determine whether vertex attributes associated with such a primitive are to be retrieved from vertex cache 206 or from supplemental cache 210 for use with attribute gradient setup in GPU pipeline 208.

In the embodiment illustrated in FIG. 2, display device 212 comprises a separate device from device 200. Display device 212 can be coupled to device 200 via a wireless connection, a wired connection, or some combination of both. For example, device 200 can comprise a server or other computing device, e.g., a server or computing device of a communication service provider, and display device 212 can be included within a device, e.g., a mobile device, connected to the server or other computing device. In such an exemplary case, by way of non-limiting examples, display device 212 can comprise a display within a mobile radiotelephone, a satellite radiotelephone, a portable computer with a network communication card (e.g., wireless, wired, or combination of both), a personal digital assistant (PDA) equipped with a network communication capability, or any of a variety of devices capable of communicating with the service provider's computing devices, or other devices connected to the service provider's computing devices.

In accordance with other embodiments disclosed, display device 212 can be integrated within device 200. By way of a non-limiting example, device 200 can comprise a mobile, and/or a handheld, device and display device 212 can comprise an integrated display of device 200. By way of another non-limiting example, device 200 can comprise a desktop or notebook computer, and display device 212 can comprise a dedicated monitor or display of device 200. By way of yet another non-limiting example, device 200 can also comprise a wired communication device or a device not principally directed to communication, and display device 200 can comprise a display within the device. For example, device 200 can comprise a PDA or handheld video game device that includes display device 212. Hence, in accordance with various embodiments, video imagery for display on display device 212 can be obtained from a device that is local or remote to display device 212.

Figure 3:
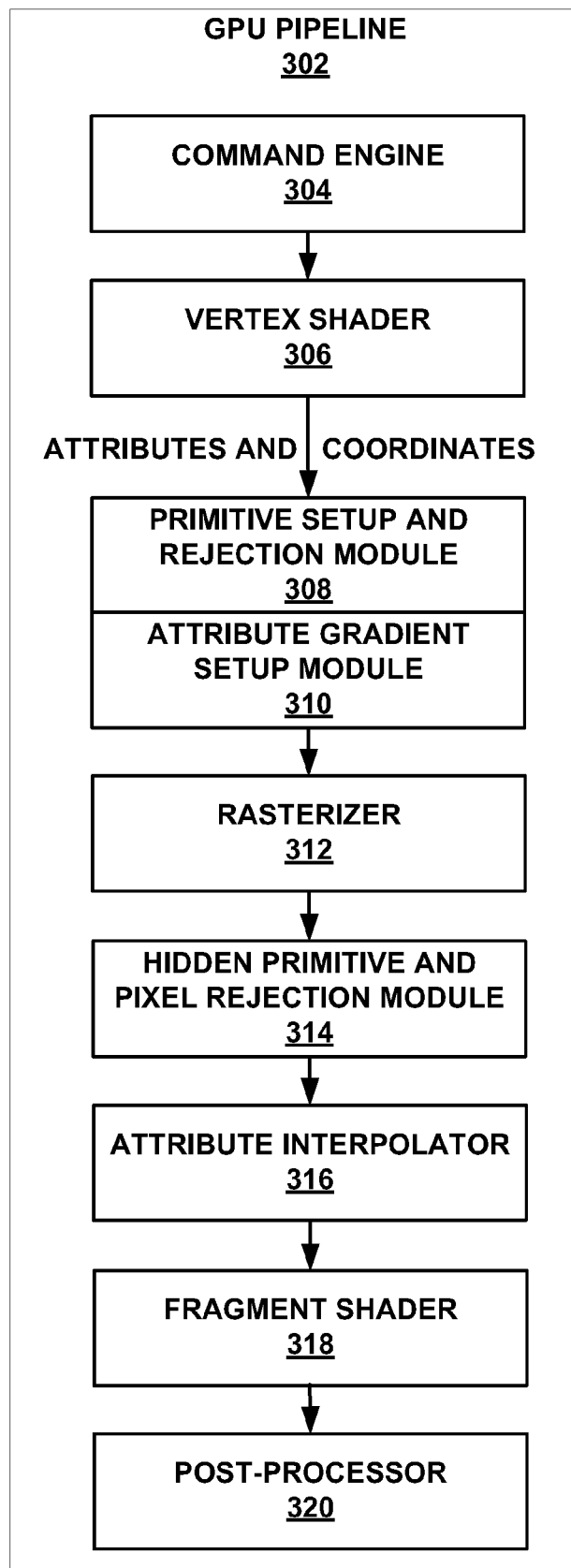
FIG. 3 provides an example of a block diagram illustrating a graphics processing unit pipeline within a graphics processing unit using a supplemental cache in accordance with one or more embodiments of the present disclosure.

FIG. 3 provides an example of a block diagram illustrating a GPU pipeline 302 within a GPU 204 using supplemental cache 210 in accordance with one or more embodiments of the present disclosure. GPU 204 can be included within a device substantially similar to device 200 from FIG. 2, for example. GPU pipeline 302 includes a command engine 304, a vertex shader 306, a primitive setup and rejection module 308, an attribute gradient setup module 310, a rasterizer 312, a hidden primitive and pixel rejection module 314, an attribute interpolator 316, a fragment shader 318, and a post processor 320.

Command engine 304 receives an image geometry and rendering commands for an image from a controller (e.g., controller 202) of the device (e.g., device 200) in which GPU 204 resides. The image geometry can correspond to representations of complex, two-dimensional or three-dimensional computerized graphics, for example. The image geometry and rendering commands can be passed along GPU pipeline 302 to various processing stages of the GPU pipeline 302.

In the example shown in FIG. 3, GPU pipeline 302 includes at least three major pipeline stages: a vertex shader stage, a primitive setup and interpolation stage, and a fragment shader stage. Vertex shader 306 is applied to the image geometry and determines surface properties of the image at vertices within the image geometry. In this way, vertex shader 306 generates vertex coordinates and attributes of each of the vertices within the image geometry. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. The vertex attributes, for example, may include color, normal, and texture coordinates associated with a vertex. In accordance with embodiments disclosed herein, vertex shader 306 within GPU 204 passes attributes and/or coordinates for vertices process by vertex shader 306 to a vertex cache, such as vertex cache 206 of FIG. 2.

The primitive setup and interpolation stage in GPU pipeline 302 includes sub-stages, e.g., primitive setup and rejection module 308, attribute gradient setup module 310, rasterizer 312, hidden primitive and pixel rejection module 314, and attribute interpolator 316, each of which use either vertex coordinates or vertex attributes to process the image geometry. Processing stages in GPU pipeline 302 can receive inputs, e.g., the vertex coordinates and the vertex attributes of vertices within the image geometry, by passing these inputs along GPU pipeline 302. First In, First Out (FIFO) buffers and/or other types of buffers can be included between each of the processing stages in GPU pipeline 302 to balance the pipeline stages by storing the vertex attributes.

Primitive setup and rejection module 308 assembles primitives with one or more vertices within the image geometry, applies perspective projection and viewport transformation, on primitive vertices and determines edge coefficients for each primitive edge. In addition, primitive setup and rejection module 308 can examine a primitive to determine whether or not to reject the primitive, e.g., by performing scissoring or backface culling using the XY coordinates of a primitive's vertices to determine whether or not to reject the primitive or a portion thereof from consideration for a given image frame. For example, a primitive or primitive portion can be determined to be invisible, e.g., located on a backside of an object within the image frame, in which case the primitive or portion thereof can be rejected by the primitive setup and rejection module 308.

To a large extent, image processing load associated with primitive setup and rejection module 308 depends on the number of vertex coordinates associated with the primitives to be processed by primitive setup and rejection module 308. As is described in more detail below, vertices can be shared between primitives. In accordance with embodiments presently disclosed, supplemental cache 210 is used to store transformed coordinate values generated for a given primitive so that transformed coordinate values of vertices that a primitive shares with a subsequently-processed primitive can be used with the subsequently-processed primitive. By retaining shared transformed coordinate values of vertices that a primitive shares with another primitive, e.g., using supplemental cache 210, transformation operations can be avoided and image processing needed to perform coordinate transformation can be reduced. In addition and in a case that vertex coordinates are stored in vertex cache 206, transmission of information to and from the GPU pipeline 302 and vertex cache 206 can be reduced.

Attribute gradient setup module 310 computes gradients of attributes associated with the primitives for the image geometry. In accordance with embodiments presently disclosed, an attribute gradient comprises a difference between the attribute value at a first pixel and the attribute value at a second pixel within a primitive moving in either a horizontal (X) direction or a vertical (Y) direction. Attribute gradient setup module 310 uses vertex attributes to compute the attribute gradients. Determining attribute gradients from vertices of each primitive is computationally intensive, and can result in reduced efficiencies in image processing by GPU pipeline 302. In accordance with embodiments of the present disclosure, supplemental cache 210 is used to reduce the need to retrieve attribute values from vertex cache 206 and to generate attribute values associated with a primitive vertex shared between primitives processed by attribute gradient setup module 310.

Once the attribute gradient values are computed, rasterizer 312 converts the primitives for the image geometry into pixels based on the XY coordinates of each of the vertices within the primitives and the number of pixels included in the primitives. Hidden primitive and pixel rejection module 314 rejects hidden primitives and hidden pixels within the primitives, e.g., using the early depth and stencil test based on the Z coordinates of the vertices within the primitives. Primitives or pixels within primitives can be considered hidden, and be rejected from consideration during processing of a specific frame of the image, for example, when the primitives or the pixels within primitives are located behind another object within the image frame or are transparent within the image frame.

Attribute interpolator 316 interpolates the attributes over pixels within the primitives based on the attribute gradient values. Attribute interpolator 316 can disregard attributes of vertices associated with rejected primitives within the image geometry. The interpolated attribute values are then input to fragment shader 318 to perform pixel rendering of the primitives. Fragment shader 318 determines surface properties of the image at pixels within the primitives for the image geometry. Results of fragment shader 318 can be output to post-processor 320 for presentation of the processed image on a display device, e.g., display device 212.

Figure 4:
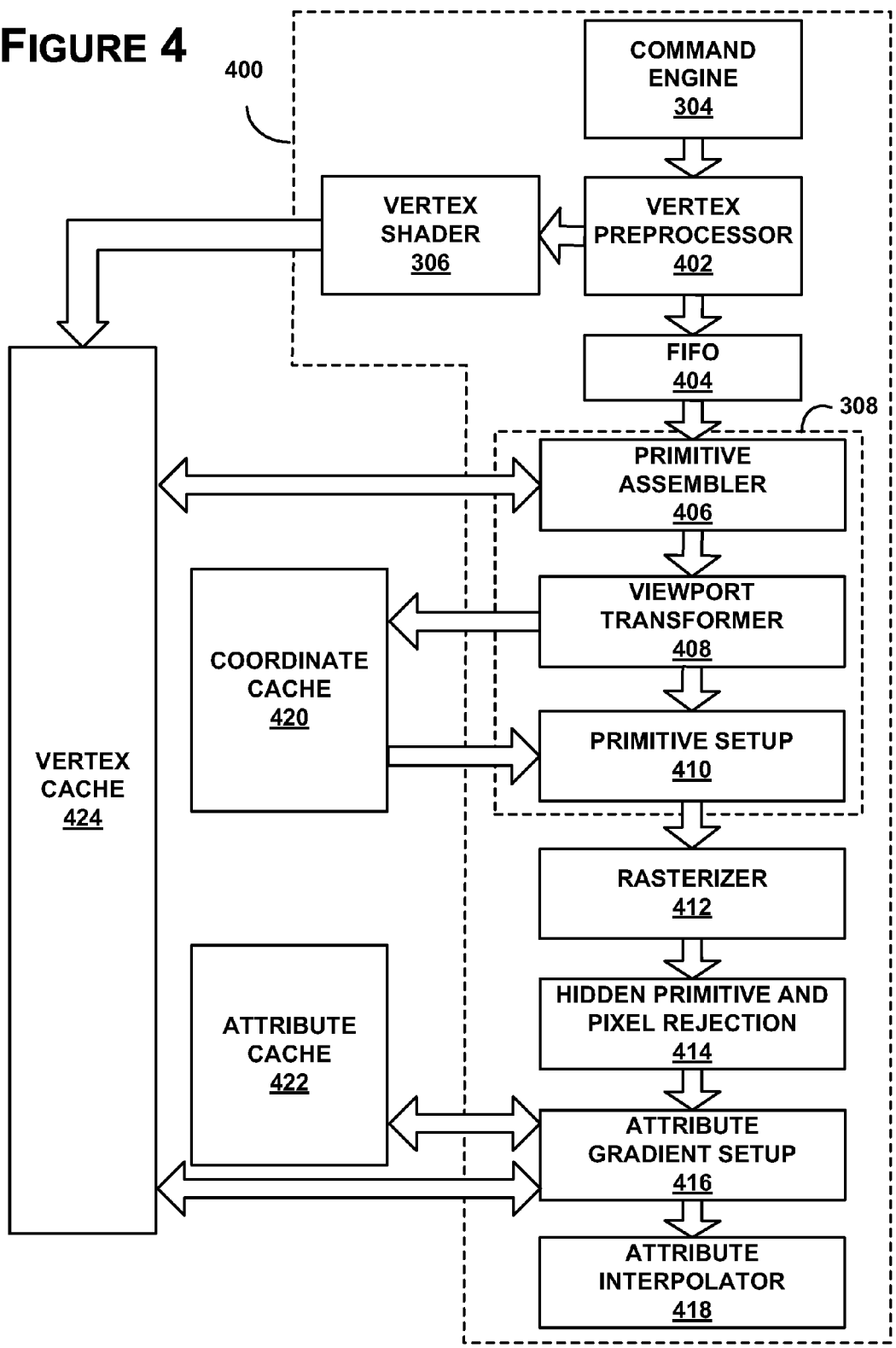
FIG. 4 provides an example of a block diagram illustrating a graphics processing pipeline for use with a graphics processing unit, which uses a supplemental cache in accordance with one or more embodiments of the present disclosure.

FIG. 4 provides an example of a block diagram illustrating another architecture for GPU pipeline 208, e.g., GPU pipeline 400, for use with GPU, e.g., GPU 204, which uses supplemental cache 210 in accordance with one or more embodiments of the present disclosure. In accordance with one or more disclosed embodiments, vertex cache 424 corresponds to vertex cache 206, and coordinate cache 420 and attribute cache 422 correspond to supplemental cache 210. Vertex cache 424, coordinate cache 420 and attribute cache 422 are coupled to GPU pipeline 400. Coordinate cache 420 and attribute cache 422 can be used in accordance with embodiments of the present disclosure to store coordinate values and attribute values, respectively, in order to minimize the need to regenerate coordinate and/or attribute values, and to minimize the data passing between the GPU pipeline 400 and vertex cache 424.

GPU pipeline 400 includes command engine 304, vertex preprocessor 402, vertex shader 306, FIFO buffer 404, primitive assembler 406, viewport transformer 408, primitive setup 410, rasterizer 412, hidden primitive and pixel rejection module 414, attribute gradient setup module 416, and attribute interpolator 418. Other components of GPU pipeline 400 not shown in FIG. 4 include a fragment shader and a post-processor, e.g., fragment shader 318 and post-processor 320, respectively, of FIG. 3.

Primitive setup and rejection module 306, which comprises primitive assembler 406, viewport transformer 408 and primitive setup 410, rasterizer 412, hidden primitive and pixel rejection module 414, attribute gradient setup module 416, and attribute interpolator 418 each use either vertex coordinates or vertex attributes to process the image geometry. For example, primitive assembler 406, viewport transformer 408, primitive setup 410, rasterizer 412, hidden primitive and pixel rejection module 414 operate using the vertex coordinates.

Attribute gradient setup module 416 and attribute interpolator 418 operate using vertex attributes.

As previously discussed, in accordance with one or more embodiments, command engine 304 receives an image geometry and rendering commands for an image from a controller, such as controller 202 of device 200. Command engine 304 passes information, e.g., index information identifying a location of coordinate/attribute values associated with vertices within the image geometry to vertex preprocessor 402. Vertex preprocessor 402 determines whether the vertex is included in vertex cache 424, e.g., using the index information for a given vertex forwarded to vertex preprocessor 402 by command engine 304. If vertex preprocessor 402 determines that the vertex is not in vertex cache 424 (a "missed vertex"), it forwards the vertex information to vertex shader 306. Vertex shader 306 is applied to a missed vertex within the image geometry, e.g., to determine surface properties of the image at the missed vertices within the image geometry. In this way, vertex shader 306 can be used to generate vertex coordinates and attributes of each of the missed vertices within the image geometry, for example. Vertex attributes, and in accordance with one or more embodiments vertex coordinates, generated by vertex shader 306 are stored in vertex cache 424. In accordance with disclosed embodimens, vertex cache 424 can be configurable to handle different numbers of attributes, coordinates, vertices and primitive types.

In accordance with one or more embodiments, vertex shader 306 need not be applied to the hit vertices within the image geometry as vertex coordinates and attributes of each of the hit vertices were previously generated and stored in vertex cache 424. In a case that vertex preprocessor 402 determines that a given vertex is included in vertex cache 424, vertex preprocessor 402 passes information for the vertex determined to already be included in vertex cache 424 (a "hit vertex") to FIFO 404. In either case, vertex preprocessor 402 passes information for a vertex to FIFO 404. Information passed to FIFO 404 includes index values that indicate storage locations within vertex cache 424 of the vertex coordinates and attributes for both the hit and missed vertices in the image geometry. In addition, vertex preprocessor 402 forwards a "hit flag" to FIFO 404, which identifies whether the vertex is a "hit vertex" or a "missed vertex".

In accordance with one or more embodiments, the information contained in FIFO 404 for a given vertex is passed to primitive assembler 406. Primitive assembler 406 receives the vertex cache index values for the coordinates of each of the vertices in the image geometry, together with the hit flag for each such vertex, from FIFO 404. Primitive assembler 406 uses the value of the "hit" flag and the vertex cache index values to determine whether information, e.g., transformed vertex coordinates, for a primitive currently being processed is already stored in coordinate cache 420. In accordance with one or more embodiments, viewport transform 408, which performs such operations as perspective projection and coordinate transformation, need not be used to generate transformed vertex coordinates for a vertex that a current primitive shares with a previously-processed primitive, since the transformed coordinate values from the coordinate cache 420 can be used for the given vertex of the primitive currently being processed. For those vertices determined by primitive assembler 406 not to be stored in coordinate cache 420, primitive assembler 406 retrieves vertex coordinates from vertex cache 424 using the vertex cache index values. The vertex coordinates identify the vertices within the image geometry based on, for example, a four-dimensional coordinate system with X, Y, and Z (width, height, and depth) coordinates that identify a location of a vertex within the image geometry, and a W coordinate that comprises a perspective parameter for the image geometry. Viewport transform 408 operates on the retrieved coordinates, e.g., the X and Y coordinates, to generate transformed coordinates, which can then be stored in coordinate cache 420 for use with a subsequently-processed primitive based on a determination of whether or not the subsequently-processed primitive shares the vertex with the primitive currently being processed.

In accordance with one or more embodiments, therefore, primitive assembler 406 can form primitives with one or more vertices, the coordinates of which are stored in coordinate cache 420 from a previously-processed primitive, and/or one or more vertices the coordinates of which are retrieved from vertex cache 424 and transformed by viewport transformer 408. In accordance with at least one of the embodiments, the coordinates of the vertices used to form a current primitive are either transformed using viewport transformer 408 in processing performed connection with a previously-processed primitive and/or in processing performed in connection with the primitive currently being processed.

Figure 5A:
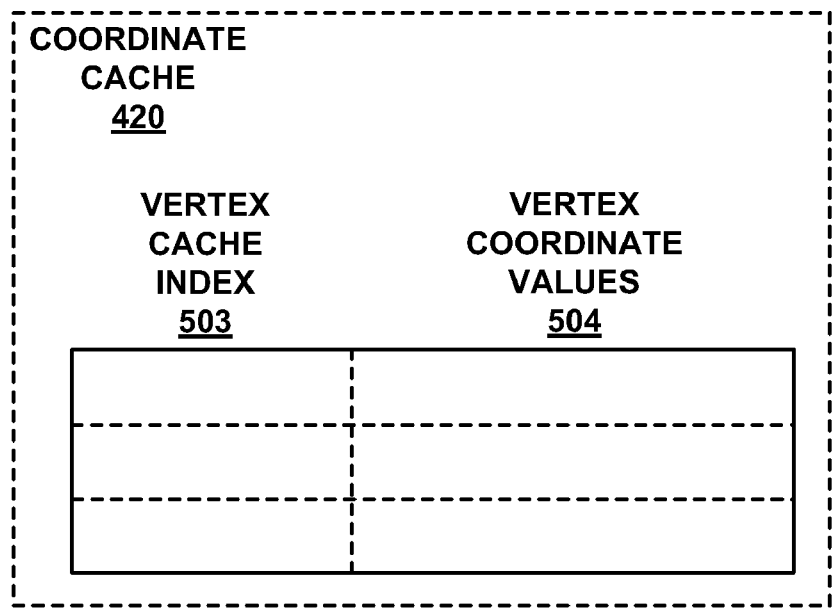
FIG. 5, which comprises FIGS. 5A and 5B, provides an example of a supplemental cache for use in accordance with embodiments of the present disclosure.

Referring to FIG. 5A, coordinate cache 420 can include vertex cache 424 index value 503 and vertex coordinate values 504 for a vertex. In accordance with one or more embodiments presently disclosed, coordinate cache 420 stores information for a number of vertices, the number equaling the number of vertices for a primitive, e.g., three vertices in a case of a triangular primitive, or some other number based on efficiencies and tradeoffs determined based on a given set of circumstances. Such circumstances can include, by way of a non-limiting example, the type of primitive used, the likelihood that vertices will be shared by more than two primitives, power consumption issues, response time, etc. In accordance with one or more embodiments, coordinate cache 420 and attribute cache 422 comprise level zero cache. It should be apparent, however, that other types of caches, e.g., level one cache, can be used with disclosed embodiments.

Referring again to FIG. 4, in accordance with one or more embodiments, other components in GPU pipeline 400 can make use of the transformed coordinate values stored in coordinate cache 420. For example, primitive setup 410 can use the transformed coordinate values (e.g., transformed X and Y coordinates) to perform backface culling, scissoring/3 D clipping, edge coefficient determination, etc. Thus, for example, coordinate values of vertices determined to be a part of the image frame by primitive setup 410 can be passed along the GPU pipeline 400 to rasterizer 412 and hidden primitive and pixel rejection module 414, for example. Primitive setup 410 can reject primitives or portions thereof from consideration during processing of a specific frame of the image when the primitives or primitive portion is invisible within the image frame, e.g., a primitive or primitive portion located on a backside of an object within the image frame. In accordance with one or more embodiments, hidden primitive and pixel rejection module 414 rejects hidden primitives and hidden pixels within the primitives using an early depth and stencil test based on the Z coordinates of the vertices within the primitives. If hidden primitive and pixel rejection module 414 rejects all pixels within a primitive, the primitive is automatically rejected. Primitives or pixels within primitives may be considered hidden, and be rejected from consideration during processing of a specific frame of the image, when the primitives or the pixels within primitives are located behind another object within the image frame or are transparent within the image frame.

In accordance with an embodiment, as shown in FIG. 4, attribute gradient setup module 416 is performed after primitive setup 410 and hidden primitive and pixel rejection module 414 are performed and before attribute interpolator 418 in GPU pipeline 400. By virtue of this arrangement, gains in efficiency can be achieved. By way of a non-limiting example, attribute gradient setup 416 can limit its processing to those attributes of vertices remaining after primitive setup 410 and hidden primitive and pixel rejection module 414. Furthermore and for those vertices processed by attribute gradient setup 416, attribute cache 422 can be used to store attribute values for vertices shared between primitives processed by the attribute gradient setup 416, thereby reducing the amount of processing required.

Figure 5B:
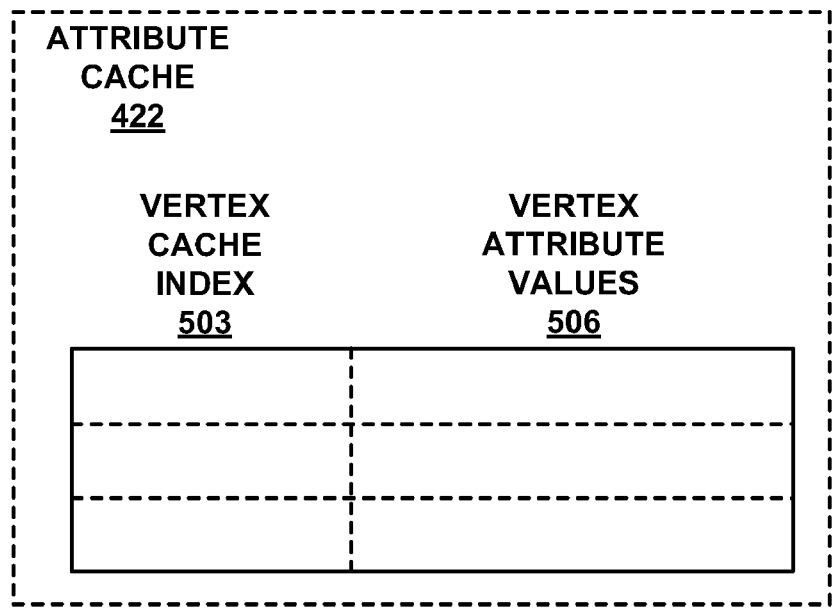

Referring to FIG. 5B, attribute cache 422 can include the vertex cache index value(s) 503, which identify storage locations of vertex attributes in vertex cache 424, and vertex attribute values 506 for a vertex. In accordance with one or more embodiments presently disclosed, attribute cache 422 stores information for a number of vertices, as discussed herein.

Referring again to FIG. 4, rasterizer 412 converts the primitives for the image geometry into pixels based on the X and Y coordinates of vertices within the primitives and the number of pixels included in the primitives. For each of the vertices of a primitive processed by attribute gradient setup module 416, module 416 can retrieve vertex attributes from either vertex cache 424 using the vertex cache index values for each of the vertices within the primitives, or from attribute cache 422, in a case that a vertex from a primitive currently being processed is shared with a previously-processed primitive. In a case that the vertex attribute values are retrieved from vertex cache 424, attribute gradient setup module 416 computes perspective-corrected attribute values corresponding to each attribute retrieved from vertex cache for the vertex and then stores perspective-corrected attribute values in attribute cache 422. When all perspective-corrected attributes for all vertices with the currently processed primitive are ready, attribute gradient setup module 416 computes gradients of attributes associated with the primitives for the image geometry. An attribute gradient comprises a difference between the attribute value at a first pixel and the attribute value at a second pixel within a primitive moving in either a horizontal (X) direction or a vertical (Y) direction.

Attribute interpolator 418 interpolates the attributes over pixels within the primitives based on the attribute gradient values. The interpolated attribute values are then input to a fragment shader, such as fragment shader 318 of FIG. 3, to perform pixel rendering of the primitives. Fragment shader 318 determines surface properties of the image at pixels within the primitives for the image geometry. Results of fragment shader 318 can be output to a post-processor, e.g., post-processor 320 where alpha blending, for instance, may be performed, for presentation of the processed image, e.g., using display device 212.

It should be apparent that supplemental cache 210 can be used with any GPU pipeline, including a GPU pipeline other than that shown in FIG. 4. By way of a non-limiting example, supplemental cache 210 can be used with GPU pipeline 302 shown in FIG. 3.

In accordance with one or more embodiments, a type of primitive, e.g., triangle list, triangle strip, triangle fan, line list, line strip, point, etc. is input to the GPU 204 (e.g., via a GPU driver), together with the primitive input data. The primitive type is determined by an application that uses the GPU 204. In some cases, the primitive type corresponding to an input vertex stream can be used to assist in determining the size of supplemental cache 210.

FIG. 6 provides an example of an input vertex stream in a case that the primitive type is a triangle list and the corresponding triangle primitives processed in accordance with embodiments of the present disclosure. The example of a triangle list primitive type used to represent an image geometry provides an example of the efficient use of vertex cache 424 conserve external memory bandwidth and vertex shader 306 computation for hit vertices. In addition, the example illustrates the efficient reuse, during processing of a current primitive, of values computed in connection with previously-processed primitives in accordance with embodiment of the present disclosure. Although the example is described with reference to a triangle list primitive type, it should be apparent that embodiments of the present disclosure can be used with any other type of primitive, including the primitive types discussed herein.

In the example shown in FIG. 6, the input vertex stream is as follows:

0, 1, 2, 2, 1, 3, 2, 3, 4, 4, 3, 5, 4, 5, 6, . . . , n−3, n−2, n−1

Although a vertex is represented using a single-digit representation, it should be apparent that this is merely a shorthand, which is being used herein for simplicity sake. The actual content typically comprises index values for each vertex, the index values for a given vertex identifying storage locations in memory external to GPU 204 for coordinate and attribute values for the given vertex. In the above input vertex stream example, three vertices are used for each triangle primitive. In the triangle list example, each occurrence of a given number, e.g., 1, indicates the same vertex, and a series of three numbers represent a triangle. Thus, in the example, as shown in FIG. 6, triangle primitive, or simply triangle, 601A corresponds to the first three vertices, "0, 1, 2", triangle 601B corresponds to the next three vertices input, "2, 1, 3", and so on. Triangles 601A and 601B share vertices 1 and 2, triangles 601B and 601C share vertices 2 and 3, triangles 601C and 601D share vertices 3 and 4, triangles 601D and 601E share vertices 4 and 5, etc.

In a conventional approach, the triangle primitives are assembled without regard to whether any of the triangles share one or more vertices with one or more other triangles. For example, to assemble triangles 601A and 601B, the conventional approach uses the first three vertices, e.g, "0, 1, 2", to assemble triangle 601A, and then repeats the processing performed on the vertices, e.g., "1" and "2" in assembling triangle 601B, without regard to the fact that these vertices are shared by triangles 601A and 601B. As can therefore be seen, the conventional approach uses resources inefficiently, e.g., the conventional approach regenerates vertex values for the shared vertices, e.g., perspective projection and viewport transformation coordinate values and/or perspective-correction attribute values, and uses "read-traffic" bandwidth to read values from vertex cache 424 to process the shared vertices.

In contrast to the conventional approach, in accordance with embodiments of the present disclosure, values previously generated for shared vertices are "reused", thereby avoiding the processing that would otherwise be used to generate the vertex values, as well as avoiding unnecessarily accessing vertex cache 424. In other words, embodiments of the present disclosure avoid processing and bandwidth usage performed under the conventional approach. By storing generated vertex values in supplemental cache 210 and providing a mechanism for identifying shared vertices, e.g., vertices shared between neighboring primitives, embodiments of the present disclosure are able to identify shared vertices and use vertex values previously generated for the shared vertices, thereby avoiding duplicative processing and unnecessary traffic between the GPU pipeline 400 and vertex cache 424.

FIG. 7, which comprises FIGS. 7A to 7D, provides vertex cache content and hit flag value examples illustrative of the processing performed based on the input vertex stream of FIG. 6 by a graphics processing unit's graphics pipeline in accordance with embodiments of the present disclosure.

In accordance with one or more embodiments, vertex preprocessor 402, in conjunction with vertex cache 424, recognizes duplicative vertices in the input vertex stream, e.g., a vertex that is shared by neighboring primitives. Vertex cache 424 stores results of vertex shading computations performed by vertex shader 306 on vertices in the input vertex stream. The vertex shader 306 result(s) stored in the vertex cache 424 for a given vertex can be used to avoid duplicative vertex shading computation, minimize access to external memory, and to identify that a vertex was previously-processed by the GPU pipeline 400. As discussed herein, if vertex preprocessor 402 determines that a vertex is a hit vertex, e.g., vertex shading result(s) for the vertex are found in vertex cache 424, vertex preprocessor 402 can set a value for hit flag 701 of FIG. 7 corresponding to the vertex. A "HIT" value for a given vertex identifies that the vertex was received by vertex preprocessor 402 (at least once prior to processing the current primitive) and processed by vertex shader 306 with at least one result of computations performed by vertex shader 306 being stored in vertex cache 424. Conversely, a "MISS" value indicates that there are no values for the vertex in cache 424. This outcome can indicate that the vertex has not previously been processed by GPU pipeline 400, or that the vertex was previously processed and the values stored in vertex cache 424 were removed from vertex cache 424, e.g., removed to make room for values associated with one or more other vertices. The "HIT" and "MISS" values for hit flag 701 are used herein as exemplary values, for the sake of discussion. It should be apparent that the "HIT" and "MISS" concept can be represented using any values, including binary digit Boolean values, or mechanism.

Hit flag 701 associated with a given vertex can be used, in accordance with one or more embodiments, to determine whether a vertex of a primitive currently being processed is shared with a vertex from a previously-processed vertex. In accordance with one or more of such embodiments, hit flag 701 associated with a given vertex is used together with at least one index value identifying a storage location in vertex cache 424 of a value (e.g., a vertex value generated by vertex shader 306) for the vertex to determine whether the vertex is a shared vertex. Hit flag 701 provides additional confirmation that the two vertices that share the same vertex cache 424 storage location are the same vertex.

Figure 7A:
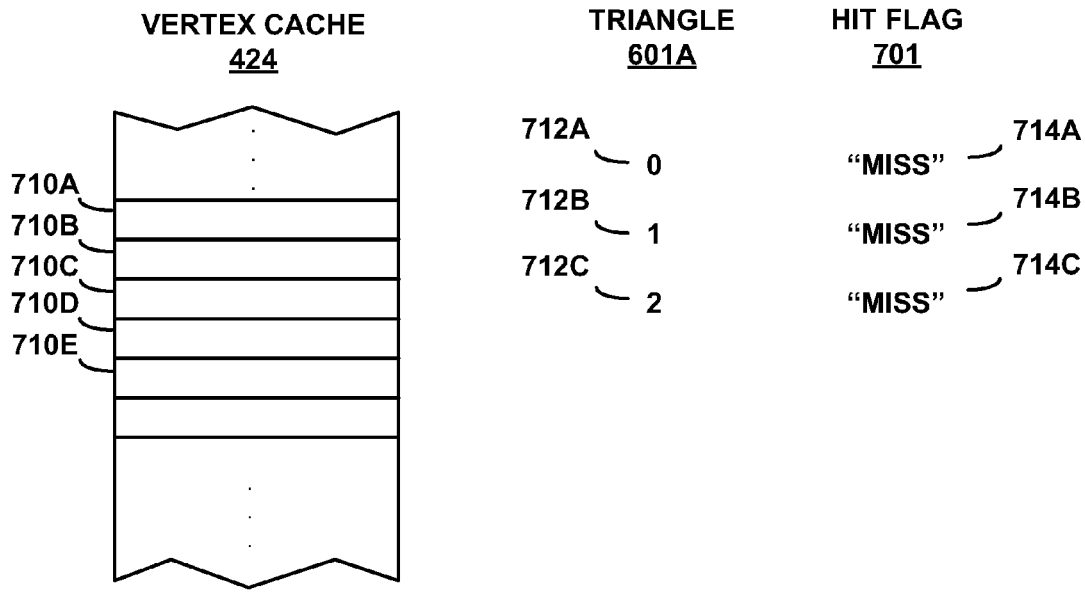
FIG. 7, which comprises FIGS. 7A to 7D, provides vertex cache content and hit flag value examples illustrating processing performed based on the input vertex stream of FIG. 6 by a graphics processing unit in accordance with embodiments of the present disclosure.

By way of a non-limiting example, reference is made to FIG. 7A, which shows an empty vertex cache 424 prior to processing any vertices from the input vertex stream example by GPU pipeline 400. As vertices 712A to 712C for triangle 601A are received as input to GPU pipeline 400, vertex preprocessor 402 checks vertex cache 424 to determine whether or not vertex cache 424 is storing any values for vertices 712A to 712C are stored in vertex cache 424. In the example of FIG. 7A, since there are no values in vertex cache 424, vertex preprocessor 402 sets hit flag 701 to "MISS" for each of vertices 712A to 712C, and forwards vertices 712A to 712C notifies vertex shader 306 so that vertex shader 306 can process the vertices. Values generated for each of vertices 712A to 712C by vertex shader 306 are then stored in vertex cache 424.

Vertex preprocessor 402 forwards the hit flag 701 value and vertex cache index values for each vertex processed by vertex preprocessor 402 to primitive assembler 406 via FIFO 404. As is described in more detail below with reference to FIG. 8, in accordance with embodiments of the present disclosure, primitive assembler 406 uses the value of the hit flag 701 to determine whether or not to compare vertex cache index values for a vertex with vertex cache index values stored in supplemental cache 210 to detect shared vertices.

Figure 7B:
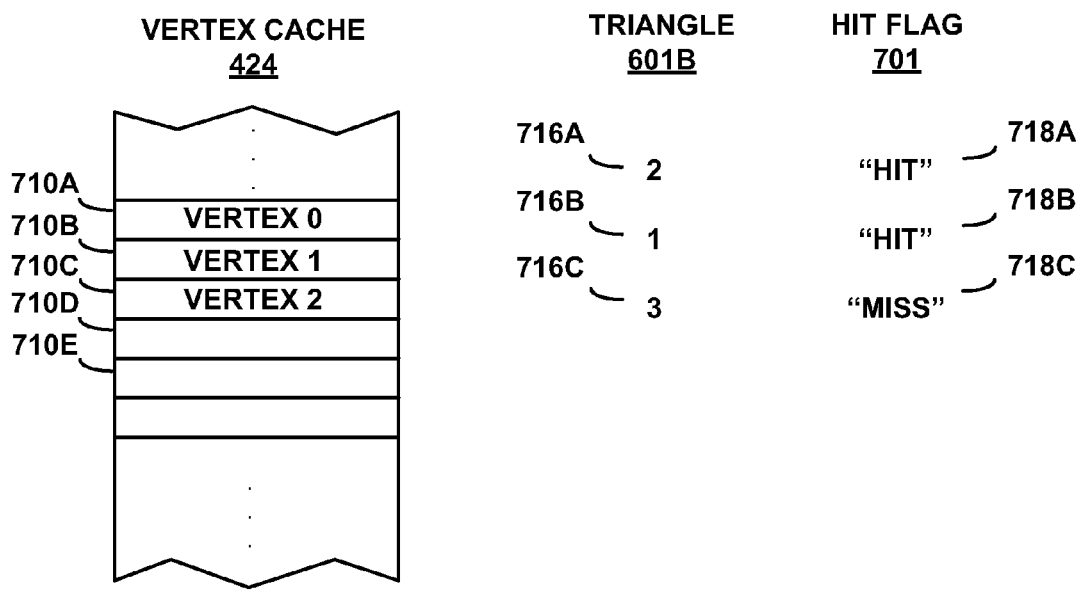

Vertex preprocessor 402 continues to process the vertices in the triangle list input vertex stream example. With reference to FIG. 7B, vertex cache 424 contains values generated by vertex shader 306, in connection with triangle 601A, for vertices 712A to 712C stored in entries 710A to 710C, respectively. As vertices 716A to 716B of triangle 601B are received as input to GPU pipeline 400, vertex preprocessor 402 checks vertex cache 424, to determine whether or not it contains stored values for any of the received vertices 716A to 716C. In this example, vertex cache 424 stores values associated with vertices 716A and 716B, as illustrated by entries 710B and 710C, respectively, of vertex cache 424. Values 718A and 718B of hit flag 701 corresponding to vertices 716A and 716B, respectively, reflect that vertex cache 424 stores values for vertices 716A and 716B in entries 710B and 710C of vertex cache 424, respectively. Value 718C of hit flag 701 corresponding to vertex 716C indicates that vertex preprocessor 402 was unable to locate and stored vertex values for vertex 716C of triangle 601B in vertex cache 424. Vertex preprocessor 402 forwards the value of hit flag 701 and vertex cache index values for triangle 601B to FIFO 404 for processing by primitive assembler 406.

Figure 7C:
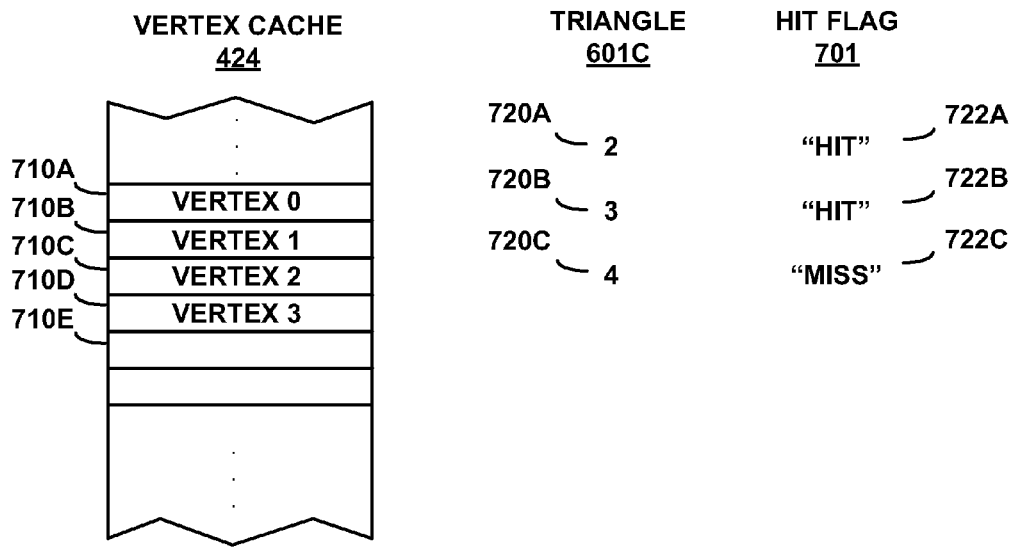
Figure 7D:
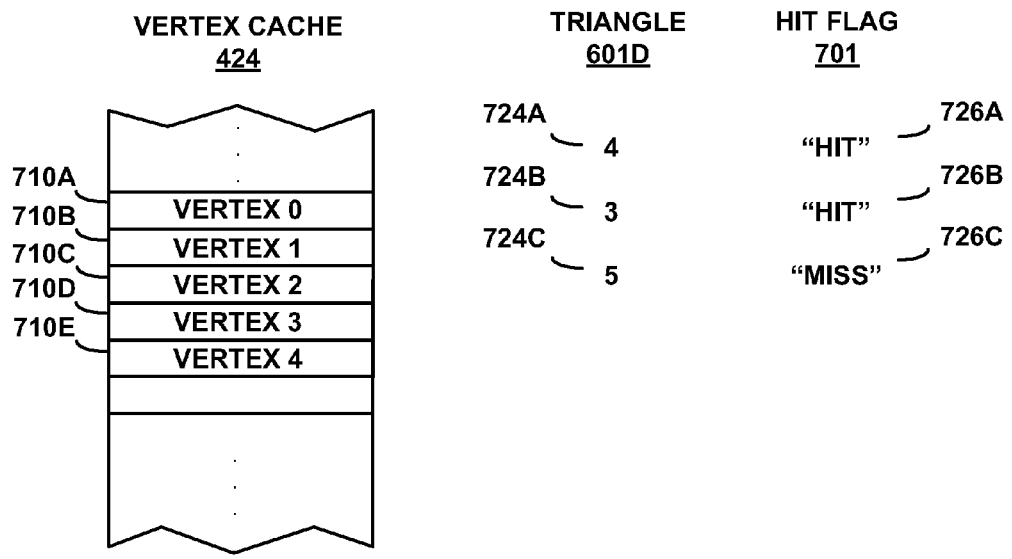

Vertex preprocessor 402 continues to process vertex input from the input vertex stream for triangle 601C, checking vertex cache 424 to determine whether to send a vertex to vertex shader 306 and to determine a value for hit flag 701 based on the contents of, e.g., presence or absence of values stored in, vertex cache 424 for a given vertex in the input vertex stream. With reference to FIG. 7C, vertex cache 424 has values stored for vertices 0, 1, 2 and 3, as shown by entries 710A to 710D of vertex cache 424, at the time that vertices 720A to 720C of triangle 601C are processed by vertex preprocessor 402. Values 722A to 722C of hit flag 701 corresponding to vertices 720A to 720C, respectively, result from the preprocessing. Similarly and with reference to FIG. 7D, values 726A to 726C of hit flat 701 are set based on the contents of vertex cache 424, e.g., entries 710A to 710E of vertex cache 424, in connection with the preprocessing of vertices 724A to 724C of triangle 601D.

In accordance with one or more embodiments, primitive assembler 406 receives the vertex cache index values, e.g., the vertex cache index values for coordinates and attribute values, of each of the vertices in the input vertex stream, together with the corresponding hit flag 701 value set by vertex preprocessor 402 for each such vertex via FIFO 404. Primitive assembler 406 uses the value of hit flag 701 and the vertex cache index values to determine whether values, e.g., transformed vertex coordinates and/or perspective-corrected attributes, for a primitive currently being processed are already stored in supplemental cache 210, e.g., coordinate cache 420 and/or attribute 422.

FIG. 8, which comprises FIGS. 8A to 8D, provides supplemental cache 210 content examples illustrating processing performed based on the vertex input stream of FIG. 6 by GPU pipeline 400 and the information forwarded by vertex preprocessor 402 in accordance with embodiments of the present disclosure. For each vertex for which supplemental cache 210 stores values (e.g., coordinates and/or attribute values), supplemental cache 210 stores index value(s) identifying locations in vertex cache 424 of vertex values for the vertex, and transformed coordinate values and/or generated attribute values.

In the example of FIG. 8, supplemental cache 210 stores vertex values 804 for up to three vertices. Of course, it should be apparent that supplemental cache 210 can comprise any number of entries. The number can be based on any number of factors and/or circumstances, including those discussed herein. FIG. 8 provides an example of entries in supplemental cache 210, as each of triangles 601A to 601D are processed by GPU pipeline 400.

Figure 8A:
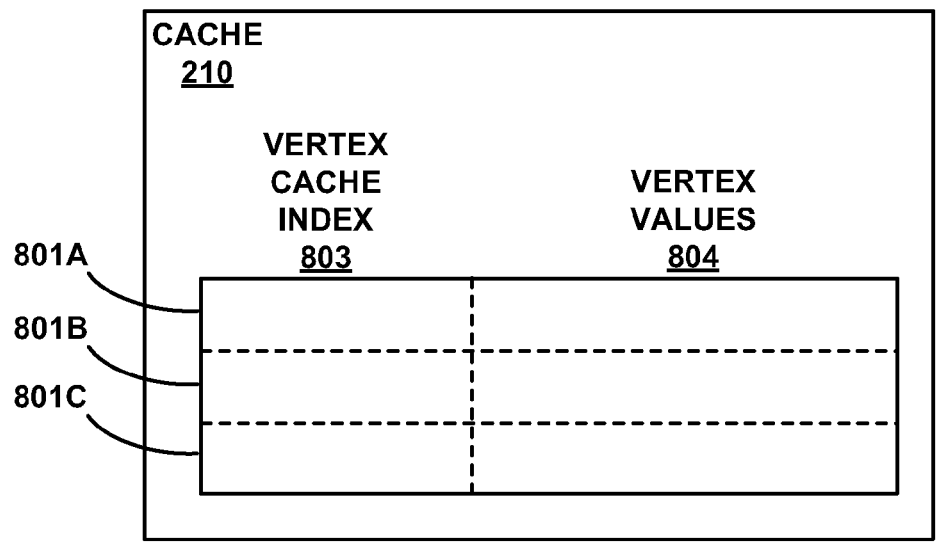
FIG. 8, which comprises FIGS. 8A to 8D, provides supplemental cache content examples illustrating processing performed based on the input vertex stream of FIG. 6 by a graphics processing unit in accordance with embodiments of the present disclosure.
Figure 8B:
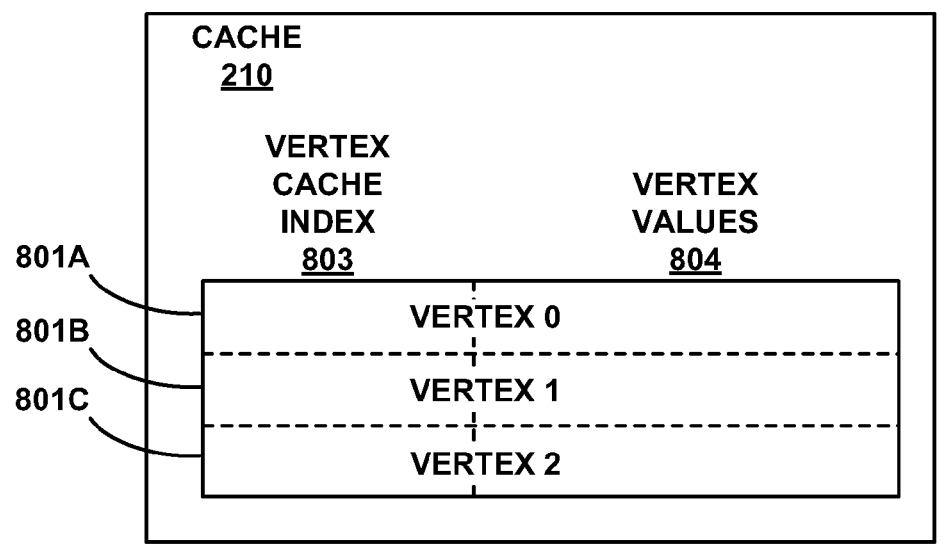
Figure 8C:
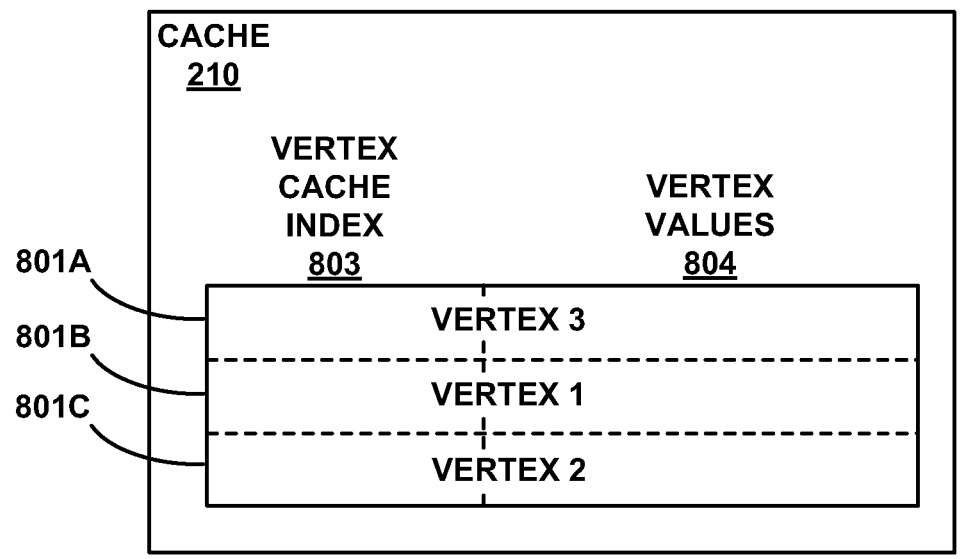

As can be seen from the "MISS" value 714A to 714C of hit flag 701 shown in FIG. 7A, each of vertices 712A to 712C is a missed vertex. As a result, viewport transformer 408 performs operations, e.g., perspective correction and viewport transformation, for the vertices. The results are then stored in entries 801A to 801C of supplemental cache 210 for vertex 0 to 2 of triangle 601A, as shown in FIG. 8B, for example. In accordance with embodiments of the present disclosure, supplemental cache 210 also includes values generated by attribute gradient setup 416.

When triangle 601B is processed, primitive assembler 406 determines using the values 718A to 718C of hit flag 701 provided by vertex preprocessor 402 via FIFO 404 that vertices 716A and 716B, e.g., vertices 1 and 2, of triangle 601B were previously processed by GPU pipeline 400. Primitive assembler 406 compares the vertex cache index values 803 stored in supplemental cache 210 with the vertex cache 424 index values associated with vertices 716A and 716B, e.g., as retrieved from FIFO 404, to determine that a match exists between the vertex cache 424 index values for vertices 716A and 716B and the vertex cache index values 803 stored in supplemental cache 210 entries 801B and 801C of FIG. 8B. Since the value 718C of hit flag 701 corresponding to vertex 716C indicates a missed vertex, there is no need to check supplemental cache 210 in connection with vertex 716C. Based on the determination by primitive assembler 406 that vertices 712B and 712C of triangle 601A and vertices 716B and 716A of triangle 601B, respectively, primitive assembler 406 examines supplemental cache 210 to determine whether or not supplemental cache 210 stores vertex values 804 for the vertices shared by triangles 601A and 601B. If so, primitive assembler 406 determines that vertices 1 and 2 are shared vertices. Vertex values, e.g., transformed coordinates and generated attribute values, generated for vertices 1 and 2 by GPU pipeline 400 and stored in supplemental cache 210 in connection with triangle 601A can be used by GPU pipeline 400 while processing triangle 601B.

Vertex values for vertex 716C, or vertex 3, were not found in vertex cache 424 by vertex preprocessor 402, as indicated by value 718C of hit flag 701. Vertex values for vertex 3 may never have been stored in vertex cache 424 by vertex shader 306, or the values may have been removed prior to processing vertex 3 for triangle 601B, for example. GPU pipeline 400 processes vertex 3, e.g., vertex 716C, in connection with triangle 601B, e.g., using viewport transformer 408 and/or attribute gradient setup 416, and stores the coordinate and attribute values for vertex 3 of triangle 601B in supplemental cache 210, as illustrated by entry 801A of FIG. 8C.

Using the value 722C of hit flag 701 corresponding to vertex 720C of triangle 601C, e.g., vertex 4, primitive assembler 406 determines that vertex 720C of triangle 601C does not have a corresponding entry in supplemental cache 210. In addition and based on values 722A and 722B, primitive assembler 406 determines that vertices 720A and 720B may have corresponding entries in supplemental cache 210. Primitive assembler 406 compares the vertex cache index values 803 stored in entries 801A to 801C of FIG. 8C with vertex cache 424 index values corresponding to vertices 720A and 720B. Based on this comparison, primitive assembler 406 determines that triangle 601C shares vertices 2 and 3 with triangle 601B. The determinations made by primitive assembler 406 in connection with vertices 720A to 720C are then used to forego generating vertex values for vertices 720A and 720B by viewport transformer 408 and attribute gradient setup 416, and to perform the computations for vertex 720C.

Figure 8D:
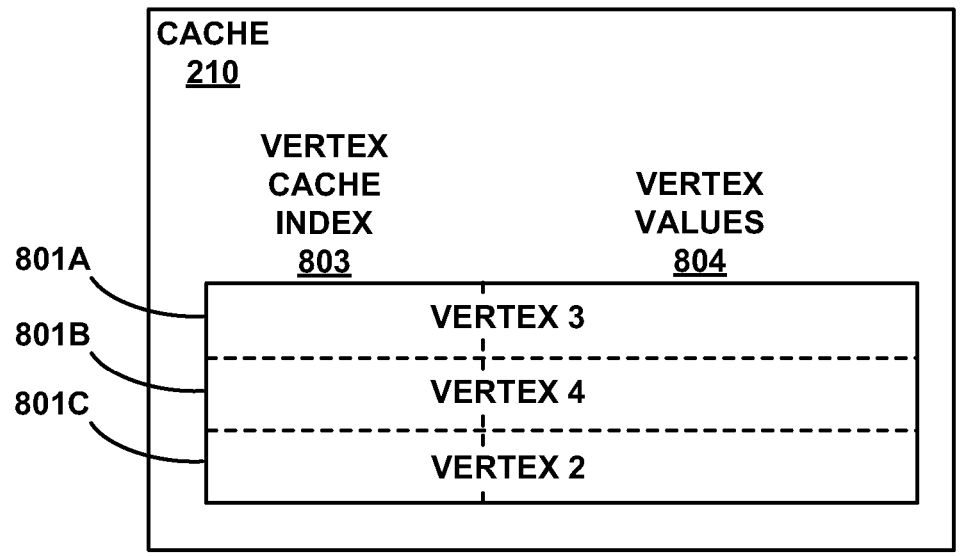

Similarly, using the values 726A to 726C of hit flag 701 corresponding to vertices 724A to 724C of triangle 601D, primitive assembler 406 decides to compare the vertex cache index values 803 stored in entries 801A to 801C of FIG. 8D with vertex cache 424 index values corresponding to vertices 724A and 724B. Based on this comparison, primitive assembler 406 determines that triangle 601D shares vertices 3 and 4 with triangle 601C. In addition and based on the value 726C of hit flag 701, primitive assembler 406 determines that vertex 724C of triangle 601D does not have a corresponding entry in supplemental cache 210. The determinations made by primitive assembler 406 are then used to forego generating vertex values for vertices 724A and 724B by viewport transformer 408 and attribute gradient setup 416, and to perform the computations for vertex 720C.

Figure 9A:
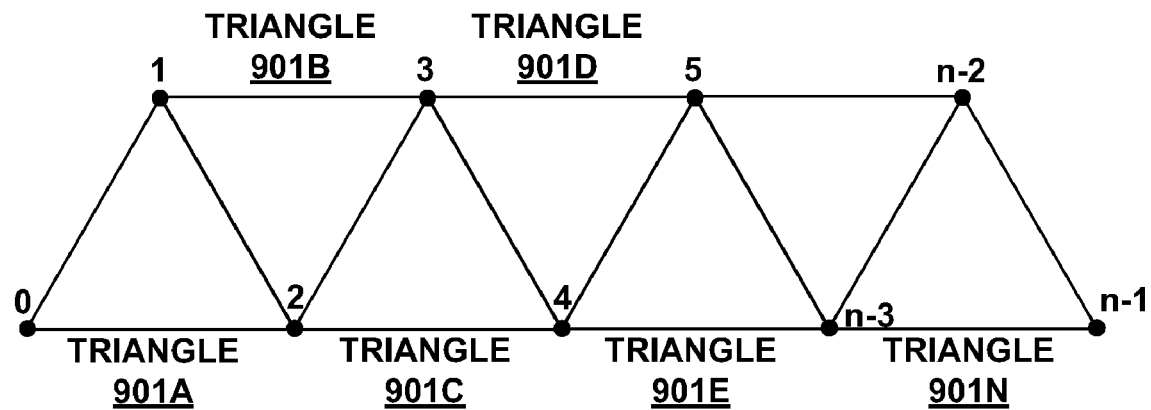
FIG. 9, which comprises FIGS. 9A and 9B, provides examples of triangle strip and triangle fan primitive types which can be used with embodiments of the present disclosure.
Figure 9B:
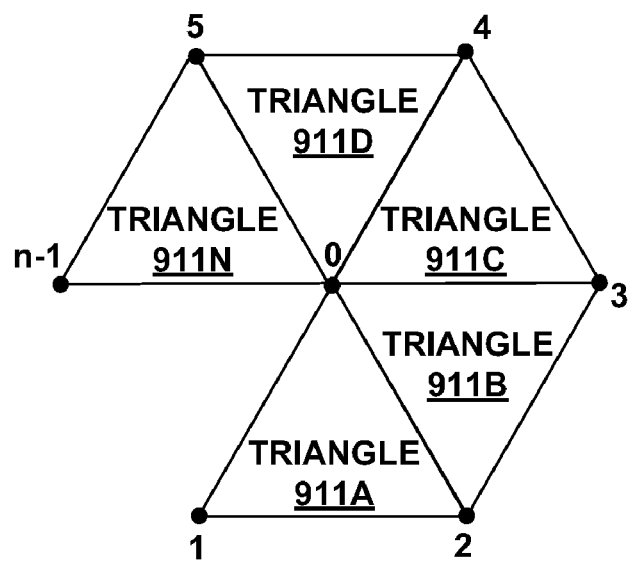

A primitive strip and a primitive fan are other examples of primitive types. FIG. 9, which comprises FIGS. 9A and 9B, provides examples of a primitive strip and a primitive fan, respectively. The example of FIG. 9A, illustrates a triangle strip primitive type which corresponds to the following input vertex stream:

0, 1, 2, 3, 4, 5, . . . , n−3, n−2, n−1

Primitive assembler 406 automatically assembles primitives from the input as below:

(0, 1, 2), (2, 1, 3), (2, 3, 4), (4, 3, 5), (4, 5, n−3), . . . , (n−3, n−2, n−1)

The above sets of vertices correspond to triangles 901A to 901E and 901N of FIG. 9A. For the first triangle, three new vertices are needed from the input vertex stream. For subsequent triangles, however, one new vertex is needed from the input vertex stream, since each subsequent triangle shares two vertices from the previous triangle.

FIG. 9B provides an example of a triangle fan primitive type, which corresponds to the following input vertex stream:

0, 1, 2, 3, 4, 5, . . . , n−3, n−2, n−1, which primitive assembler 406 assembles into triangle primitives as follows:

(0, 1, 2), (0, 2, 3), (0, 3, 4), (0, 4, 5), . . . , (0, 5, n−1)

The above sets of vertices correspond to triangles 911A to 911D and 911N. In a case of the triangle strip or triangle fan, after the first triangle, vertex preprocessor 402 and vertex cache 424 handle one new vertex per new triangle. The primitive assembler 406 uses the new vertex and automatically reuses two vertices from the previous triangle, in accordance with an assembling approach corresponding to the primitive type. In a case that the primitive type is a strip of a fan, primitive assembler 406 need not consult hit flag 701. Primitive assembler 406 processes one vertex for each primitive after the first primitive, and can automatically use vertex values for the shared vertices from the previous neighboring primitives.

However, fan and strip primitive types are typically limited in use. More particularly, fan and strip primitive types are typically used for simple image geometry. In contrast, list primitive types can uniformly represent any shaped image geometry. A list primitive type is therefore typically preferred by application developer. In some cases, an application developer may use a combination of primitive types, e.g., fan, strip or list primitive types. In a case that the image geometry is defined using a primitive strip or a primitive fan, embodiments of the present disclosure can be used with a supplemental cache 424 sized to facilitate identification of shared primitives beyond the two adjoining primitives automatically handled by primitive assembler 406 in processing a fan or strip primitive type. In addition, in a case that the image geometry is defined using a combination of primitive types, which combination can include a primitive strip, a primitive fan or some other combination of primitive types, embodiments of the present disclosure can be used to facilitate identification of shared vertices between the different primitive types. For example, a complex or arbitrary geometry may require many small triangle strips or triangle fans to represent the image geometry. In such a case, embodiments of the present disclosure can be used to identify shared vertices in the input vertex streams of the different primitive types.

As can be seen from the above example input vertex stream, embodiments of the present disclosure can be used to identify one or more vertices shared between primitives, e.g., neighboring primitives, to achieve efficiencies in the GPU 204, such as to reduce traffic between the vertex cache 424 and the GPU pipeline 400 and reduce computation preformed by viewport transformer 408 and/or attribute gradient setup 416.

As can be seen from the example, in accordance with embodiments of the present disclosure, efficiencies are achieved at least with respect to GPU pipeline 400 processing a reduced number of vertices using supplemental cache 210. In the example shown in FIG. 1, the number of vertices associated with N triangles is equal to three times N. e.g., twelve vertices in a case that N equals four. Referring to the example described with reference to FIGS. 6 to 8, input corresponding to N triangles times 3 vertices is received by vertex preprocessor 406, which is the same input as with the N triangles in the FIG. 1, e.g., three vertices per triangle primitive. Although the number of vertices received as input is the same as in the convention approach, the number of vertices processed by GPU pipeline 400 is reduced using embodiments of the present disclosure. In the example described with reference to FIGS. 6 to 8, processing triangles 601A to 601D using the conventional approach would result in all twelve of the vertices input for triangles 601A to 601D being processed, e.g., 4 triangle primitives with three vertices per primitive. However, using embodiments of the present disclosure, the number of vertices processed is reduced from the 12 to 6, e.g., the three vertices of the first triangle processed plus one vertex for each subsequent triangle processed, which is half the number of vertices processed using the conventional approach.

Furthermore and although a list primitive type has twice the input than that of a fan or strip primitive type, embodiments of the present disclosure can be used to achieve a reduction is the number of vertices processed comparable to that of a fan or strip. For example, the number of vertices input and processed by the GPU pipeline 400 in a case of a fan or strip is 3+(N−1), where N is equal to the number of primitive and three represents the number of vertices per primitive (e.g., a triangle primitive type), all of which are processed by the primitive assembler 406 processing a strip or fan. Although the input corresponding to a primitive list is at least twice the number of vertices input for a fan or strip, embodiments of the present disclosure can be used to avoid processing approximately half of the vertices input with the primitive list. It can be seen just from the example when N is equal to four, e.g., four triangles, that the number of vertices input in the input vertex stream in the case of a triangle list is 12, with only six vertices needing to be processed by GPU pipeline 400. This is a significant reduction in processing of a triangle list, for example.

In addition to triangles, embodiments of the present disclosure can be used with the supplementary cache 210 to reduce traffic bandwidth and computations for other primitive types, including lines and polygons. For example and in a case of a line primitive type, if the line currently being processed by GPU pipeline 400 shares a vertex with one or more previously-processed lines, the shared vertex can be retrieved from supplementary cache 210 for use with the line currently being processed by GPU pipeline 400. As yet another non-limiting example, in a case of a polygon primitive type and assuming the number of entries of the supplementary cache 210 is at least equal to the maximum number of vertices of the polygon, for example, if any vertices in the current polygon match vertices of previously-processed polygons, the shared vertices can be retrieved from the supplementary cache 210 for use with the polygon currently being processed by GPU pipeline 400.

Figure 10A:
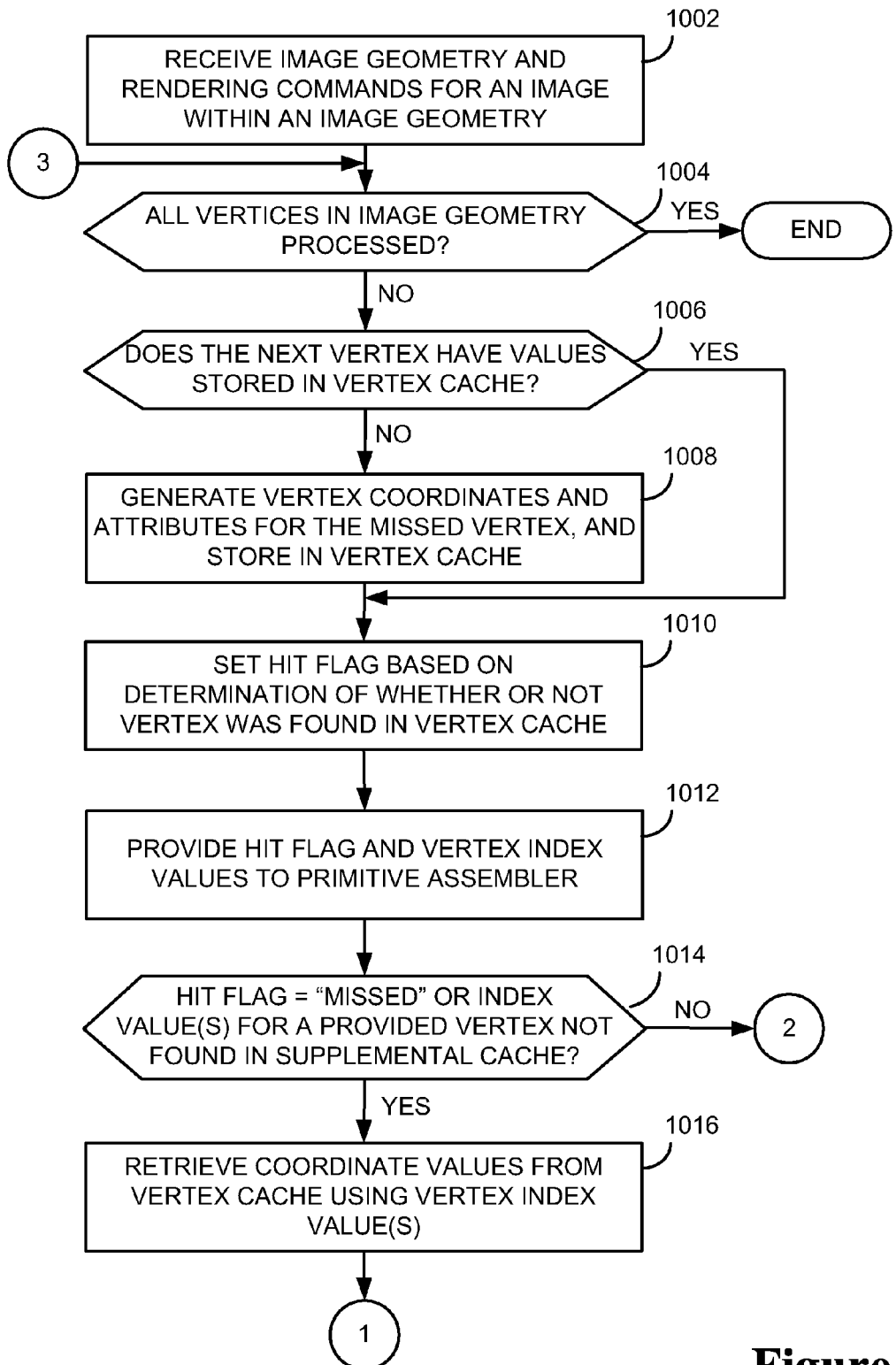
FIG. 10, which comprises FIGS. 10A and 10B, provides an example of a process flow for use in processing vertex information using a graphics pipeline and a supplemental cache in accordance with embodiments of the present disclosure.
Figure 10B:
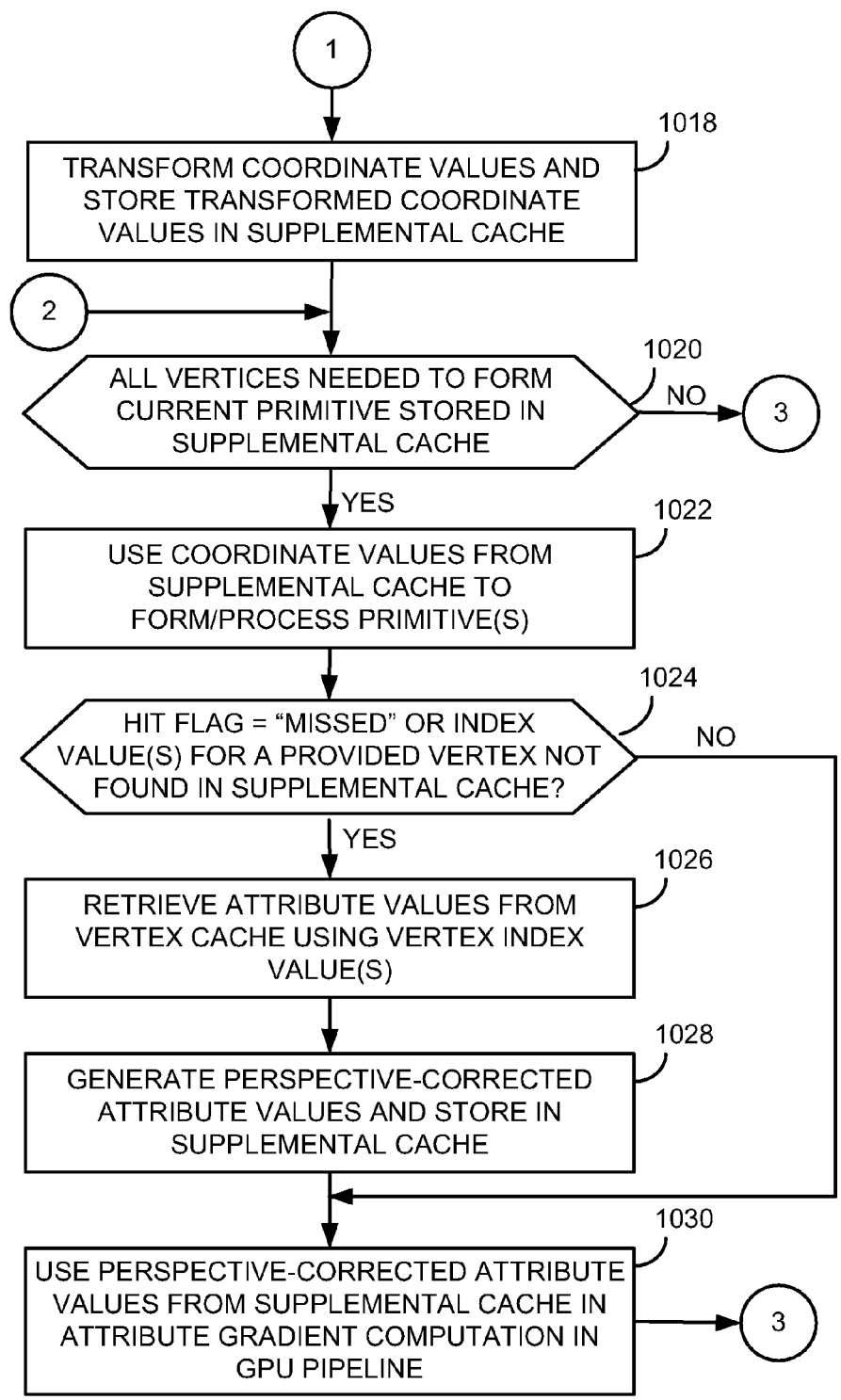

FIG. 10, which comprises FIGS. 10A and 10B, provides an example of a process flow for use in processing vertex information using a graphics pipeline, e.g., GPU pipeline 208 or 400, and a supplemental cache, e.g., supplemental cache 210, in accordance with embodiments of the present disclosure. In general, image processing performed by the GPU pipeline 208 uses supplemental cache 210 to store vertex values, e.g., coordinate and/or attribute values, so that vertex values can be "re-used" for vertices shared by primitives processed by the GPU pipeline. A hit flag is examined to determine whether or not a vertex is newly-added to vertex cache 206, and vertex cache index values associated with each "hit vertex" are compared with vertex cache index values in the supplemental cache 210 until a shared vertex is discovered, or all of the entries in the supplemental cache 210 have been examined. If cached values are not found in supplemental cache 210, the GPU pipeline 210 retrieves the coordinate and/or attribute values from a vertex cache, e.g., vertex cache 206. The values retrieved from vertex cache 206 are then operated on by the GPU pipeline, and the resulting values can be stored in supplemental cache 210 for a given vertex, together with the vertex cache index value(s) for the vertex.

Referring to FIG. 10A, at step 1002, image geometry and rendering commands for an image are received by a GPU, e.g., GPU 204, and processing continues to process the vertices received. At step 1004, a determination is made whether any of the vertices received remain to be processed. If not, GPU pipeline processing can end, with the processed image being output to an output device, such as display device 212. If one or more vertices remain, processing continues at step 1006 to determine whether the next vertex is stored in vertex cache 206. If the coordinates and/or attributes for the vertex are determined to not be stored in vertex cache 206, index values identifying at least one external memory storage location are forwarded to a vertex shader, e.g., vertex shader 306, at step 1008, so that coordinate and attribute values can be generated for the vertex by the vertex shader 306. Coordinate and attribute values are then stored in vertex cache 206, at step 1008. In addition, a hit flag associated with the vertex is set, at step 1010, based on the outcome of the determination made in step 1006, as discussed herein.

At step 1012, the hit flag and vertex index values identifying at least one vertex cache 206 storage location for a given vertex are provided to the GPU pipeline, e.g., primitive assembler 406 of GPU pipeline 400. At step 1014, the GPU pipeline, e.g., primitive assembler 406 of GPU pipeline 400, determines based on the hit flag and the vertex index values associated with a vertex whether or not the vertex corresponds with an entry in supplemental cache 210. If the hit flag is set to indicate a "missed vertex", e.g., a vertex for which vertex information was forwarded to the vertex shader, or the index value(s) provided to the primitive assembler are not found in the supplemental cache, coordinate values are retrieved from vertex cache 206, at step 1016. The coordinate values retrieved from vertex cache 206 undergo at least one transformation, e.g., a viewport transformation, and the transformed coordinate values are stored in supplemental cache 210, at step 1018 of FIG. 10B. If a determination is made, at step 1014, that the hit flag is set to indicate a "hit vertex", e.g., a vertex for which coordinate and/or attribute information was previously stored in vertex cache 206 by the vertex shader 306, and the index value(s) provided to the primitive assembler 406 are found in the supplemental cache 210, coordinate values are retrieved from supplemental cache 210, rather than retrieving the coordinate values (or the attribute values) associated with the vertex from vertex cache 206.

At step 1020, processing continues to determine whether each vertex needed to assemble a primitive are stored in, and can be retrieved from, supplemental cache 210. If not, processing returns to step 1004 to process any remaining vertices in the image geometry. If so, processing continues at step 1022 to use coordinate values from supplement cache 210 to assemble and process a primitive by the GPU pipeline.

As with coordinate values associated with a vertex, embodiments of the present disclosure use supplemental cache 210 to store perspective-corrected attribute values, e.g., attribute values generated using attribute gradient setup 416, for use with the GPU pipeline. In one or more embodiments, steps 1024 and 1026 can be performed as part of steps 1014 and 1016, respectively. In other embodiments, such as those in which attribute gradient setup is performed after performing primitive setup and/or hidden primitive and pixel rejection, steps 1024 and 1026 are performed separate from steps 1014 and 1016. In the latter case, by waiting to perform attribute gradient setup 416 until after one or both of primitive setup and hidden primitive and pixel rejection, it is possible to forego retrieving attributes from vertex cache 206 in a case that primitive setup and/or hidden primitive and pixel rejection determine that some or all of a primitive's vertices are to be rejected, e.g., because they are not to be rendered in the output image.

In any event, as with step 1014, step 1024 determines based on the hit flag and the vertex index values associated with a vertex and the vertex values stored in supplemental cache 210 whether or not the vertex corresponds with an entry in supplemental cache 210. If the hit flag is set to indicate a missed vertex, or the index value(s) provided to the primitive assembler 406 are not found in supplemental cache 210, attribute values are retrieved from vertex cache 206, at step 1026. The retrieved attribute values undergo at least one operation, e.g., perspective correction in attribute gradient setup and/or attribute interpolator, and the resulting attribute values can be stored in supplemental cache 210, at step 1028. If the hit flag is set to indicate a hit vertex and the index value(s) provided to the primitive assembler are found in the supplemental cache, attribute values can be retrieved from supplemental cache 210. At step 1030, the perspective-corrected attribute values are used in the GPU pipeline.

In accordance with one or more embodiments of the present disclosure, if a primitive is rejected or is clipped, supplemental cache 210 can be refreshed, so that coordinate and attribute values for all vertices of the primitive to be processed by the GPU pipeline 400 are fetched from vertex cache 206. In so doing, it is possible to reduce the degree to which corner condition checking is used to determine if vertex values have been fetched and transformed. In a case of 3D GB clipping, a primitive may be clipped or new vertices may be produced for the primitive as a result of the clipping. In either case, supplemental cache 210 will likely not have values for any vertex that is to be used with the new primitive. By refreshing supplemental cache 210, processing used to check for shared vertices, which is unlikely to identify shared vertices under the circumstances, can be avoided.

Use of a supplemental cache 210 in accordance with embodiments of the present disclosure result in increased performance and decreased power consumption, e.g., at least with respect to a reduction in operations performed and the reduction in data transfer to the GPU pipeline 208 from vertex cache 206. Supplemental cache 210 can comprise a number of entries corresponding to the number of vertices of a primitive, e.g., three entries corresponding to the three vertices of a triangle primitive. Alternatively, supplemental cache 210 can comprise a number of entries different than the number of primitive vertices. A number, X, of entries in supplemental cache 210 can be greater than (or equal to) the number of primitive vertices, for example. In a case that supplemental cache 210 is of a size large enough to accommodate more than the number of vertices for one primitive, there is an increased likelihood that an entry in supplemental cache 210 will correspond to a vertex of a primitive currently being processed, thereby reducing the likelihood that coordinate and/or attribute values need to be retrieved from vertex cache 206. While data transfer between vertex cache 206 and GPU pipeline 204 can be reduced as the number of entries in supplemental cache 210 is increased, other considerations, such as increased cost and/or power consumption associated with a larger cache, can be taken into account to determine an optimum size of supplemental cache 210.

In addition to the advantages discussed above, inter alia, supplemental cache 210 can be used to detect errors. For example, supplemental cache 210 can be used to determine whether two or more vertices of an assembled primitive have the same vertex cache index values. In such a case, the assembled primitive can be considered to be a "de-generated" primitive, and the assembled primitive can be rejected without further processing by the GPU pipeline 208.

In accordance with embodiments of the present disclosure, supplemental cache 210 stores both coordinate values and attribute values for a vertex. In accordance with one or more alternate embodiments of the present disclosure, supplemental cache 210 stores coordinate values for a vertex, with the attribute values for a vertex being retrieved from vertex cache 206 regardless of whether or not a vertex of a current primitive shares a vertex with a previously-processed primitive. In accordance with such alternate embodiments, vertex cache 206 is used in place of supplemental cache 210. Since there can be a number of attributes associated with a given vertex, the size of supplemental cache 210 can be significantly reduced using vertex cache 206 to store attribute values. Of course, this may require additional bandwidth and increase power consumption due to an increased amount of data being passed from vertex cache 206 to the GPU pipeline, and possible increased computations to be performed on the attribute values retrieved from vertex cache 206.

Embodiments of the present disclosure provide additional benefits, which can be seen from a discussion of a hypothetical GPU pipeline which performs vertex shading and then performs perspective correction and viewport transformation prior to storing the vertex values in the vertex cache. In the hypothetical approach, viewport-transformed and perspective-corrected vertex values are stored in the vertex cache, which values can be retrieved from the vertex cache by the primitive setup and rejection and/or attribute gradient modules. Since viewport-transformed and perspective-corrected vertex values are stored in the vertex cache in the hypothetical GPU pipeline approach, the viewport-transformed and perspective-corrected vertex values can be retrieved from the vertex cache whenever a vertex, and in particular a shared vertex, is encountered, thereby avoiding performing duplicative viewport transformation or perspective correction operations on shared vertices. However, this hypothetical approach uses more bandwidth between the vertex cache and the hypothetical GPU pipeline than is used in connection with embodiments of the present disclosure, in which a supplemental cache is used to store and retrieve values for shared vertices. In addition, the hypothetical GPU pipeline approach requires that perspective correction be performed on every primitive and its vertices prior to the primitive setup and rejection module and the hidden primitive and pixel rejection module, which results in perspective correction being performed on all vertices including those vertices whose primitives will later be rejected by the primitive setup and rejection module or the hidden primitive and pixel rejection module in the hypothetical GPU pipeline approach. In contrast, embodiments of the present disclosure provide the ability to postpone perspective correction until after the primitive setup and rejection module and the hidden primitive and pixel rejection module. In so doing, perspective correction can be limited to only the vertices of primitives that are not rejected, thereby avoiding performing perspective correction on vertices of a primitive that is subsequently rejected, and eliminating unnecessary attribute perspective correction operations and avoiding wasting resources otherwise needed to perform such perspective correction operations.

Embodiments of the present disclosure can be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

By way of further non-limiting examples, one or more disclosed embodiments can be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method for use with a graphics processing unit comprising:
    determining whether at least one vertex of a primitive currently being processed by the graphics processing unit is a previously-processed vertex associated with a primitive previously processed by the graphics processing unit;
    for each vertex of the current primitive determined to be a previously-processed vertex, using a stored value corresponding to the previously-processed vertex for the current primitive, wherein the stored value has been previously generated for the previously-processed vertex; and
    for each vertex of the current primitive determined to be other than a previously-processed vertex, generating a value corresponding to the other vertex in processing the current primitive.

2. The method of claim 1, wherein in connection with forming the previously-processed vertex, the method further comprising:
    generating a first value from which the stored value is generated and saving the first value in a vertex cache; and
    generating a second value using the first value and saving the second value as the stored value in a supplemental cache different from the vertex cache.

3. The method of claim 2, wherein the supplemental cache includes an index value identifying a location in the vertex cache of the first value, and wherein in processing the current primitive, the method further comprising:
    receiving information in connection with the primitive currently being processed, the information indicating that the first value is saved in the vertex cache in connection with the previously-processed vertex and receiving an index value identifying a location of the first value in the vertex cache;
    comparing the received index value with the index value stored in the supplemental cache to determine whether or not the vertex being processed for the current primitive corresponds to the previously-processed vertex; and
    using the second value stored in the supplemental cache for the current primitive in a case that said comparing step determines that the received index value corresponds to the index value saved in the supplemental cache.

4. The method of claim 3, wherein the stored second value comprises a coordinate value, and wherein said comparing step is performed at a primitive assembly stage of a graphics pipeline of the graphics processing unit.

5. The method of claim 3, wherein the stored second value comprises an attribute value, wherein said comparing step is performed at an attribute gradient setup stage of a graphics pipeline of the graphics processing unit, and wherein the attribute gradient setup stage is performed in the graphics pipeline after one or both of a primitive setup stage and a hidden primitive and pixel rejection stage of the graphics pipeline.

6. The method of claim 3, wherein the received information comprises a hit flag which identifies whether or not the first value was saved in the vertex cache in connection with the previously-processed vertex, and wherein said steps of comparing and using are not performed in a case that the hit flag indicates that the first value was not saved in the vertex cache.

7. The method of claim 1, wherein the primitive currently being processed and the previously-processed primitive associated with the previously-processed vertex share at least the previously-processed vertex.

8. A non-transitory computer-readable memory medium in which computer-executable program code is stored, the program code for use with a graphics processing unit and comprising code to:
determine whether at least one vertex of a primitive currently being processed by the graphics processing unit is a previously-processed vertex associated with a primitive previously processed by the graphics processing unit;
for each vertex of the current primitive determined to be a previously-processed vertex, use a stored value corresponding to the previously-processed vertex for the current primitive, wherein the stored value has been previously generated for the previously-processed vertex; and
for each vertex of the current primitive determined to be other than a previously-processed vertex, generate a value corresponding to the other vertex in processing the current primitive.

9. The non-transitory computer-readable memory medium of claim 8, wherein in connection with forming the previously-processed vertex, the program code further comprising code to:
generate a first value from which the stored value is generated and save the first value in a vertex cache; and
generate a second value using the first value and save the second value as the stored value in a supplemental cache different from the vertex cache.

10. The non-transitory computer-readable memory medium of claim 9, wherein the supplemental cache includes an index value identifying a location in the vertex cache of the first value, and wherein in processing the current primitive, the program code further comprising code to:
receive information in connection with the primitive currently being processed, the information indicating that the first value is saved in the vertex cache in connection with the previously-processed vertex and receive an index value identifying a location of the first value in the vertex cache;
compare the received index value with the index value stored in the supplemental cache to determine whether or not the vertex being processed in connection the current primitive corresponds to the previously-processed vertex; and
use the second value stored in the supplemental cache for the current primitive in a case that said code to compare determines that the received index value corresponds to the index value saved in the supplemental cache.

11. The non-transitory computer-readable memory medium of claim 10, wherein the stored second value comprises a coordinate value, and wherein said code to compare is performed at a primitive assembly stage of a graphics pipeline of the graphics processing unit.

12. The non-transitory computer-readable memory medium of claim 10, wherein the stored second value comprises an attribute value, wherein said code to compare is performed at an attribute gradient setup stage of a graphics pipeline of the graphics processing unit, and wherein the attribute gradient setup stage is performed in the graphics pipeline after one or both of a primitive setup stage and a hidden primitive and pixel rejection stage of the graphics pipeline.

13. The non-transitory computer-readable memory medium of claim 10, wherein the received information comprises a hit flag which identifies whether or not the first value was saved in the vertex cache in connection with the previously-processed vertex, and wherein said code to compare and to use is not performed in a case that the hit flag indicates that the first value was not saved in the vertex cache.

14. A graphics processing apparatus comprising:
a graphics processing unit configured to execute a graphics processing pipeline to process an image geometry for an image;
a vertex cache coupled to said graphics processing unit, said vertex cache storing at least one value corresponding to one or more vertices within the image geometry;
a supplemental cache coupled to said graphics processing unit, said supplemental cache storing values generated from the values stored in said vertex cache,
a vertex preprocessor of said graphics processing pipeline configured to make a determination as to whether a given vertex within the image geometry has values stored in said vertex cache, and providing information corresponding to the given vertex to said graphics processing pipeline, the provided information indicating the outcome of the determination and at least one index value corresponding to at least one value stored in said vertex cache for the given vertex,
wherein said graphics processing pipeline is configured to determine whether or not to use at least one generated value stored in said supplemental cache for a primitive currently being processing by said graphics processing pipeline based on the information provided by said vertex preprocessor.

15. The apparatus of claim 14, wherein the at least one generated value stored in the supplemental cache is generated by said graphics processing unit in connection with a previously-processed primitive, said graphics processing pipeline is configured to:
compare the at least one index value corresponding to the at least one generated value stored in said supplemental cache with the at least one index value provided by the vertex preprocessor to determine whether the given vertex being processed in connection with the current primitive corresponds to the vertex processed in connection with a previously-processed primitive; and
use the at least one generated value stored in said supplemental cache for the current primitive in a case that an outcome of said compare indicates that the provided index value corresponds with the index value stored in said supplemental cache.

16. The apparatus of claim 15, wherein the stored generated value comprises a coordinate value, and wherein a primitive assembler of said graphics processing pipeline compares the at least one index value corresponding with the at least one generated value stored in said supplemental cache.

17. The apparatus of claim 15, wherein the information provided by said vertex processor comprises a hit flag indicating an outcome of the determination as to whether a given vertex within the image geometry has values stored in said vertex cache, and wherein said graphics processing pipeline is further configured to use the hit flag to determine whether or not to compare the at least one index value corresponding to the at least one generated value stored in said supplemental cache with the at least one index value provided by the vertex preprocessor and to determine whether or not to use the at least one generated value stored in said supplemental cache.

18. The apparatus of claim 15, wherein the stored generated value comprises an attribute value, and wherein an attribute gradient setup module of said graphics processing pipeline compares the at least one index value corresponding with the at least one generated value stored in said supplemental cache.

19. The apparatus of claim 18, wherein said graphics processing pipeline comprises a primitive setup module and a hidden primitive and pixel rejection module, and wherein said attribute gradient setup module is positioned after one or both of said primitive setup module and said hidden primitive and pixel rejection module.

20. A method for use with a graphics processing unit comprising:
processing a first primitive using the graphics processing unit, the first primitive having more than one vertex, said processing comprising:
generating a value for each of the more than one vertex;
storing the generated value for each of the more than one vertex in a supplemental cache of the graphics processing unit;
processing a second primitive subsequent to the first primitive, the second primitive having more than one vertex, said processing comprising:
determining whether the first and second primitives share a vertex in common;
for each shared vertex that the first and second primitives have in common, using the stored value generated for the first primitive as the generated value of the shared vertex for the second primitive; and
for each vertex of the second primitive determined to be different from those of the first primitive, perform the following:
retrieving an initial value for the different vertex of the second primitive from a cache of the graphics processing unit other than the supplemental cache;
generating a value using the retrieved value; and
storing the generated value in the supplemental cache.

21. A graphics processing apparatus comprising:
a graphics processing means;
a vertex cache coupled to said graphics processing means, said vertex cache storing at least one value corresponding to one or more vertices within an image's image geometry;
a supplemental cache coupled to said graphics processing means, said supplemental cache storing values generated from the values stored in said vertex cache,
a vertex preprocessing means coupled to said graphics processing means, said vertex preprocessing means for making a determination as to whether a given vertex within the image geometry has values stored in said vertex cache, and for providing information in connection with the given vertex to said graphics processing means, the provided information indicating the outcome of the determination and at least one index value corresponding to at least one value stored in said vertex cache for the given vertex,
wherein said graphics processing means comprises:
means for executing a graphics processing pipeline to process the image's image geometry; and
means for determining whether or not to use at least one generated value stored in said supplemental cache for a primitive currently being processing by said graphics processing pipeline based on the information provided by said vertex preprocessing means.

22. The apparatus of claim 21, wherein the at least one generated value stored in said supplemental cache is generated by said graphics processing means in connection with a previously-processed primitive, said graphics processing means further comprising:
means for comparing the at least one index value corresponding to the at least one generated value stored in said supplemental cache with the at least one index value provided by the vertex preprocessor to determine whether the given vertex being processed in connection with the current primitive corresponds to the vertex processed in connection with a previously-processed primitive; and
means for using the at least one generated value stored in said supplemental cache for the current primitive in a case that said comparing means determines that the provided index value corresponds with the index value stored in said supplemental cache.

23. The apparatus of claim 22, wherein the stored generated value comprises a coordinate value, and wherein said graphics processing means further comprises a primitive assembler means for comparing the at least one index value corresponding with the at least one generated value stored in said supplemental cache.

24. The apparatus of claim 22, wherein the information provided by said vertex processor means comprises a hit flag indicating an outcome of the determination as to whether a given vertex within the image geometry has values stored in said vertex cache, said graphics processing means further comprising:
means for determining, using said hit flag, whether or not to compare the at least one index value corresponding to the at least one generated value stored in said supplemental cache with the at least one index value provided by the vertex preprocessor; and
means for determining whether or not to use the at least one generated value stored in said supplemental cache.

25. The apparatus of claim 22, wherein the stored generated value comprises an attribute value, and wherein said graphics processing means further comprises an attribute gradient setup means for comparing the at least one index value corresponding with the at least one generated value stored in said supplemental cache.

26. The apparatus of claim 25, wherein said graphics processing means comprises a primitive setup means and a hidden primitive and pixel rejection means, and wherein said attribute gradient setup means is positioned after one or both of said primitive setup means and said hidden primitive and pixel rejection means.

* * * * *